United States Patent
Arnaud

(10) Patent No.: US 6,960,294 B2
(45) Date of Patent: Nov. 1, 2005

(54) APPARATUS FOR THE SEPARATION OF SOLIDS FROM LIQUIDS BY DISSOLVED GAS FLOATATION

(75) Inventor: Johnny Arnaud, Houston, TX (US)

(73) Assignee: Hydrotreat, Inc., Houston, TX (US)

( * ) Notice: Subject to any disclaimer, the term of this patent is extended or adjusted under 35 U.S.C. 154(b) by 105 days.

(21) Appl. No.: 10/317,010

(22) Filed: Dec. 11, 2002

(65) Prior Publication Data

US 2003/0173288 A1 Sep. 18, 2003

Related U.S. Application Data

(63) Continuation-in-part of application No. 09/879,496, filed on Jun. 12, 2001, now Pat. No. 6,669,843.

(51) Int. Cl.[7] ............................... C02F 1/24; C02F 1/52
(52) U.S. Cl. .................... 210/195.1; 210/188; 210/199; 210/205; 210/206; 210/221.2; 210/258; 210/416.1; 210/512.1; 210/526; 210/532.1; 210/534; 55/459.1; 96/203; 96/206; 96/209; 261/177; 366/165.1; 366/177.1
(58) Field of Search ............................. 210/188, 195.1, 210/199, 205, 206, 221.2, 258, 416.1, 512.1, 526, 532.1, 534; 55/459.1; 96/203, 206, 209; 261/77; 366/165.1, 177.1

(56) References Cited

U.S. PATENT DOCUMENTS

| | | | |
|---|---|---|---|
| 2,735,547 A | 2/1956 | Vissac | |
| 3,289,608 A | 12/1966 | Laval, Jr. | |
| 3,447,511 A | 6/1969 | Beard et al. .................... 123/3 |
| 3,507,397 A | 4/1970 | Robinson | |
| 3,512,651 A | 5/1970 | Laval, Jr. | |
| 3,568,837 A | 3/1971 | Laval, Jr. .................... 210/136 |
| 3,947,364 A | 3/1976 | Laval, Jr. | |
| 4,156,648 A * | 5/1979 | Kuepper ................. 210/221.2 |
| 4,237,006 A | 12/1980 | Colman et al. | |
| 4,790,942 A | 12/1988 | Shmidt et al. .............. 210/650 |
| 5,000,848 A | 3/1991 | Hodgins et al. ........ 210/321.68 |
| 5,021,165 A | 6/1991 | Kalnins ....................... 210/703 |
| 5,071,542 A | 12/1991 | Tuszko et al. | |
| 5,131,757 A | 7/1992 | Smith | |
| 5,362,395 A | 11/1994 | Dorau et al. ................. 210/638 |
| 5,451,349 A | 9/1995 | Kingsley ...................... 261/91 |
| 5,478,484 A | 12/1995 | Michaluk .................... 210/788 |
| 5,538,631 A * | 7/1996 | Yeh .......................... 210/221.2 |
| 5,647,977 A | 7/1997 | Arnaud ...................... 210/167 |
| 5,794,791 A | 8/1998 | Kindig ........................ 209/727 |
| 5,882,530 A | 3/1999 | Chase ......................... 210/788 |
| 5,944,998 A | 8/1999 | Rolchigo et al. ........... 210/654 |
| 5,958,240 A * | 9/1999 | Hoel ......................... 210/221.2 |
| 6,024,874 A | 2/2000 | Lott ......................... 210/512.1 |
| 6,032,931 A | 3/2000 | Plunkett ....................... 261/77 |
| 6,080,317 A | 6/2000 | Wagner et al. .............. 210/652 |
| 6,106,713 A | 8/2000 | Miller et al. ........... 210/321.63 |
| 6,165,365 A | 12/2000 | Salyer et al. ............... 210/650 |
| 6,168,724 B1 | 1/2001 | Hurwitz ...................... 210/780 |
| 6,254,267 B1 | 7/2001 | Arnaud .................... 366/137.1 |

(Continued)

OTHER PUBLICATIONS

"Fundamentals of *General Chemistry*", C. H. Sorum, University of Wisconsin, undated.

(Continued)

Primary Examiner—David A. Reifsnyder
(74) Attorney, Agent, or Firm—Howrey LLP

(57) ABSTRACT

The present invention relates to methods and apparatus for separation of solids from liquids and separation of liquids from liquids (such as oil from water) by dissolved gas floatation. A dissolved gas floatation clarifier is described as is a liquid-gas mixer, a liquid-liquid mixer, and solid-liquid chemical feeders. The methods and apparatus of the present invention are particularly suitable for supplying dissolved air and mixing of chemicals for use in separation of solids in dissolved air floatation clarifiers.

27 Claims, 14 Drawing Sheets

U.S. PATENT DOCUMENTS

| | | | | |
|---|---|---|---|---|
| 6,458,268 | B1 | * 10/2002 | Grandprey et al. | 210/199 |
| 6,669,843 | B2 | * 12/2003 | Arnaud | 210/221.2 |
| 2003/0168211 | A1 | 9/2003 | Arnaud | 166/68 |
| 2003/0173275 | A1 | 9/2003 | Arnaud | 210/143 |
| 2003/0173276 | A1 | 9/2003 | Arnaud | 210/143 |
| 2004/0031742 | A1 | 2/2004 | Arnaud | 210/259 |

OTHER PUBLICATIONS

"Chemical Calculations An Introduction to the Use of Mathematics in Chemistry", Sidney W. Benson, University of Southern California, undated.

"Fluid Mechanics With Engineering Applications", R. L. Daugherty, California Institute of Technology, 1954.

"Equipment and Applications For Industry", Claude Laval Corporation, undated.

"Industrial Process Problem Solving . . . Solids/Liquids and Liquid/Liquid Hydrocyclones for Separation, Classification, and Dewatering", © 1995 Krebs Engineers.

Demco Cyclone Separators Catalog CI–78, Aug. 15, 1978.

GEOSOURCE® The Pioneer in solids/liquid separation, 1979 Catalog.

HYDROCYCLONES Problem Solving in Liquid/Solids Separation, Picenso International Inc., undated.

"Facts about liquid cyclones. Where to use them. Where not to use them. And how to specify the right cyclone for the job. With special emphasis on The DORRCLONE®"; © 1979 Dorr–Oliver Incorporated.

"Porous Plastics" POREX®, © 1998 Porex Technologies Corp.

"Nitroxy Siliporite® Molecular Sieves for Medical Oxygen Concentrations" CESA, no date.

"New Trends In Air Separation Adsorbents" by Marie–Theres Grandmougin, et al.; CECA, France, undated.

"Clarifying Oilfield and Refinery Waste Waters by Flotation;" Journal of Petroleum Technology, pp. 426–430, dated Apr. 1973.

"Membrane Bioreactors for Wastewater Treatment;" by Tom Stephenson, et al.; dated 2000, reprinted 2001.

"New Developments in High Shear Crossflow Membrane Filtration;" Fluid/Particle Separation Journal, pp. 123–138, vol. 4, No. 1, Mar. 1991.

"The Application of Demulsification Chemicals in Recycling, Recovery and Disposal of Oily Waters;" Sam Delchad, Ph. D., Emulsions Control Inc. California, no date.

EPA Technical Bulletin, EPA 456/F–99–006R; "Nitrogen Oxides (NOx), Why and How They Are Controlled;" Nov. 1999.

"Superior Nitrate Removal for Treatment Plants and the Home;" Sybron Chemicals Inc.; IONIC® SR–7 Advanced Anion Exchange Resin, undated.

Solicitation for Financial Assistance Applications No. DE–PS26–02NT41613; "Development of Technologies and Capabilities for Developing Coal, Oil and Gas Energy Resources;" p. 55, "3. Gas Flooding",undated.

* cited by examiner

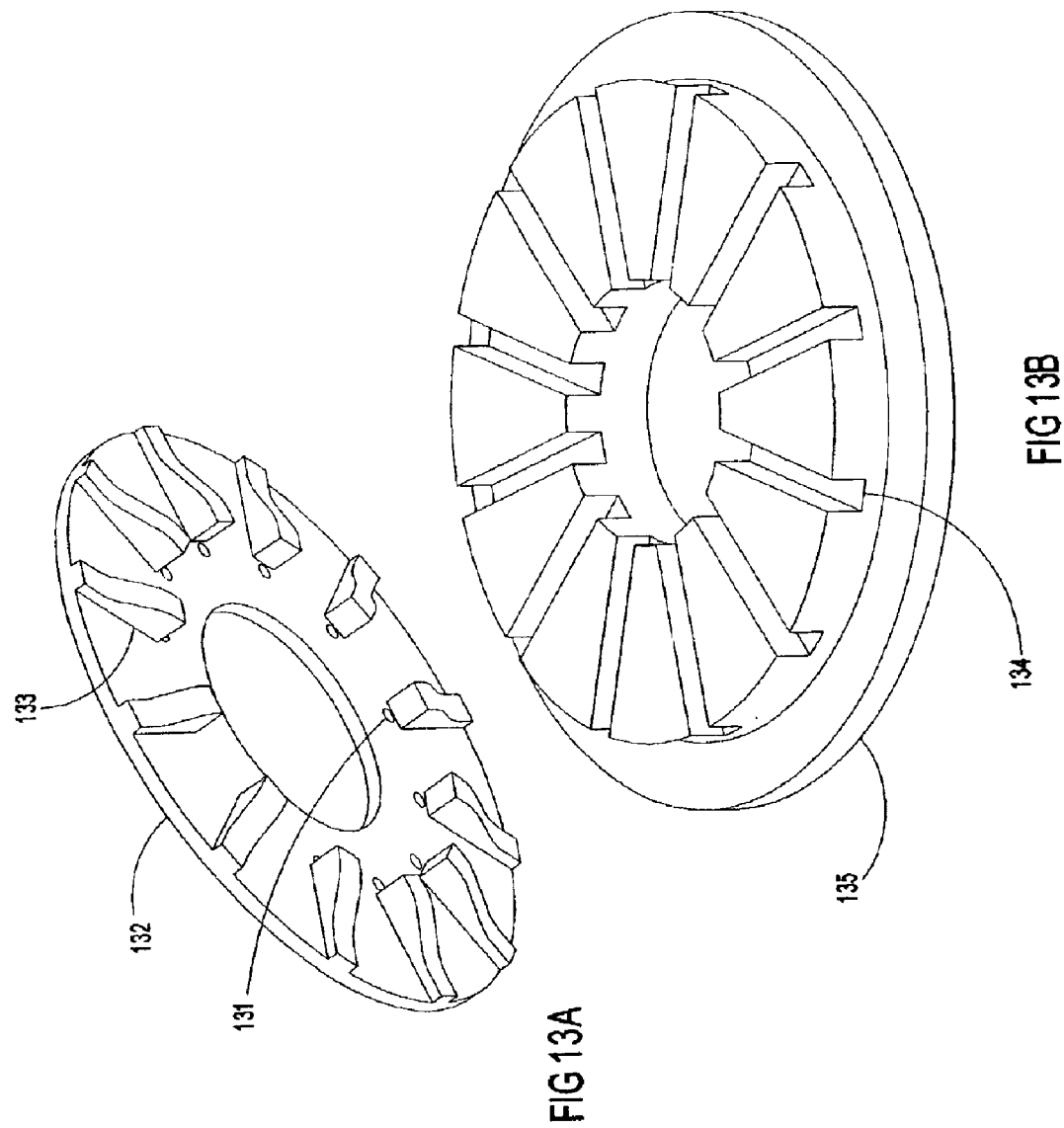

APPARATUS FOR THE SEPARATION OF SOLIDS FROM LIQUIDS BY DISSOLVED GAS FLOATATION

CROSS REFERENCE TO RELATED APPLICATIONS

This application is a continuation-in-part of patent application Ser. No. 09/879,496, filed Jun. 12, 2001, entitled "Method and Apparatus for Mixing Fluids, Separating Fluids, and Separating Solids from Fluids," by Johnny Arnaud, which is hereby incorporated by reference in its entirety, now U.S. Pat. No. 6,669,843.

BACKGROUND OF THE INVENTION

1. Field of the Invention

The present invention relates to methods and apparatus for separation of solids from liquids and separation of liquids from liquids (such as oil from water) by dissolved gas floatation. The methods and apparatus of the present invention are particularly suitable for supplying dissolved air and mixing of chemicals for use in separation of solids in dissolved air floatation clarifiers.

2. Description of Related Art

The methods and apparatus for mixing fluids and dissolving gases in liquids disclosed in co-pending patent application Ser. No. 09/879,496, filed Jun. 12, 2001, now U.S. Pat. No. 6,669,843, in the name of Johnny Arnaud and assigned to the same assignee as the present application where liquids can be totally saturated with dissolved gases at any pressure, also provides the opportunity for improvements in the methods and apparatus for separation of both solids and trace organic fluids suspended in a second fluid, such as water, by dissolved gas floatation.

Saturating a liquid such as water with a dissolved gas under pressure then injecting the saturated liquid into other water contaminated with suspended solids or suspended liquids, such as oil, and releasing the pressure allows the gas to come out of solution as microscopic (small) bubbles that rise slowly in the liquid. As the bubbles form they attach themselves to the contaminating suspended solid particles and liquid droplets increasing the buoyancy and accelerating the rise of the particles and droplets to the surface where they can be removed. The process can be used for separating solids and trace organic contaminants from fluids in dissolve air floatation clarifiers. While that exemplary application is described in the present invention, it is understood that there are many other implementations without deviating from the intent and spirit of the present invention.

The basic requirements of a system used for gas floatation of both solids and liquids have been well defined to include introduction of finely dispersed gas bubbles into the stream to be treated, a floatation zone of minimum turbulence, and a means of removing the floated material. The microscopic bubbles are obtained by either a recycle pressure system where a portion of the clarified water is recycled through a dissolved gas generator and then mixing the saturated water with the incoming wastewater stream as it enters the clarifier, or by a full-stream pressure system where the entire incoming wastewater stream flows through a dissolved gas generator ahead of the clarifier. In addition, chemicals to aid in separation of the contaminants from the water are commonly introduced into the stream and have become part of the basic requirements of gas floatation systems. The selection of systems and methods for treating specific wastewater streams depends on what contaminants are present, whether the contaminants are predominantly suspended solids with a small amount of liquid contaminants or predominantly liquids with a small amount of suspended solids, and what is to be done with the contaminants removed from the treated water.

In treating water for removal of contaminants, various chemicals perform selected functions in the treating process. The use of chemicals in wastewater treatment is discussed in U.S. Pat. No. 6,254,267, dated Jul. 3, 2001, in the name of Johnny Arnaud and assigned to the same assignee as the present application, incorporated by reference herein in its entirety. The discussions in that referenced patent on use of chemicals in wastewater treatment are repeated for clarity. The chemicals can be liquids or solids in granular or powder form. Some solids are dissolved into and used as liquids in the treating process. Other chemicals may perform their treating functions as solids.

Many solid-liquid separation processes in wastewater treatment employ coagulation and flocculation. Laymen have long used the terms "coagulation" and "flocculation" interchangeably in discussing solid-liquid separation processes. Colloid scientists, however, have adopted a more specific usage. "Coagulation" implies aggregation caused by compression of the electrical double layers surrounding colloidal particles. "Flocculation" is restricted to cases where polymer bridging or some similar mechanism operates. Coagulation and flocculation are essential in many solid-liquid separation processes, since many suspended particles are too small for gravitational settling alone to effectively remove the particles. Coagulants can be purchased in both the liquid and solid phases. Polymers used as flocculating agents can also be obtained in liquid and solid phases. In liquid phase, those chemicals must be mixed and dispersed to react with the contaminants throughout the water. In powdered or granulated solid form, those chemicals must be dissolved first and then mixed with water in order to react with the contaminants.

Chemicals that remain powdered during the treating process may also be used in addition to coagulants and flocculants to remove contaminants from water. Bentonite clays and activated carbon powders exemplify such solid chemicals used to remove organic and dissolved metal contaminants from water. The powders must be wetted, fed into the water, and dispersed in order to reach the contaminants throughout the body of water to be treated. Once injected into the water, the powders may also have to be coagulated and flocculated so they can be separated by floatation or settling to remove them from the water.

Most of the deficiencies of the present dissolved gas floatation systems are in the quality of the bubbles produced, size and cost of the apparatus used to generate the bubbles, method of introducing the bubbles into the stream of water to be treated, and the success of mixing and dispersing the chemicals added by the existing apparatus used.

The dynamics of fluid flow generally can be expressed by conservation of energy, momentum, and impulse.

SUMMARY OF THE INVENTION

The present invention provides a new method and apparatus for mixing solid chemicals and dissolving the gas used to create the microscopic bubbles for separation of suspended solids and organic contaminants from water by dissolved gas floatation.

An apparatus in accordance with the present invention may employ a dissolved gas floatation clarifier, a liquid-gas mixer as a dissolved gas generator to supply the microscopic bubbles for floatation, liquid-liquid mixers to disperse the chemicals used to aid in separation of the contaminants from the water, and solid-liquid chemical feeders to wet and dissolve the bulk powdered chemicals used in the separation process.

One embodiment of the present invention may employ a dissolved gas floatation clarifier with an inlet to provide the retention time to allow chemical separation agents to react and microscopic bubbles to form, a floatation zone of minimum turbulence with a rake to remove the floating contaminant sludge, a storage compartment in which the separated sludge is deposited, a water outlet to remove the clarified water without interfering with floatation, a settling zone for heavy solid sludge that will not float, a sludge pump for transferring the sludge out of the system, a recycle pressure aeration system that returns the recycled water to an inlet manifold with a fluid mixer applied as a dissolved gas generator to produce the microscopic bubbles, a liquid-liquid mixer to disperse the flocculating chemical in the incoming wastewater stream before it enters the clarifier, a liquid-liquid mixer to disperse the coagulating chemical in the incoming wastewater stream ahead of the flocculating chemical, and two chemical feed systems to inject the coagulating and flocculating chemicals into the liquid-liquid mixers.

A second embodiment of the present invention may employ a dissolved gas floatation system as described above, a recycle pressure aeration system with a fluid mixer applied as to produce the microscopic bubbles that returns the recycled water and mixes it into the incoming wastewater stream with a third liquid-liquid mixer ahead of an inlet manifold , two liquid-liquid mixers to disperse the coagulating and flocculating chemicals in the incoming contaminated water.

A third embodiment of the present invention may employ a dissolved gas floatation clarifier as described above, a full-stream pressure aeration system with a fluid mixer applied as a dissolved gas generator in the incoming wastewater stream ahead of where the flocculating agent is introduced to produce the microscopic bubbles, two liquid-liquid mixers to disperse the coagulating and flocculating chemicals in the incoming contaminated water.

A fourth embodiment of the present invention may employ a dissolved gas floatation clarifier as described above, a recycle pressure aeration system that returns the recycled water to an inlet manifold with a fluid mixer applied as a dissolved gas generator to produce the microscopic bubbles, two liquid-liquid mixers to disperse the coagulating and flocculating chemicals in the incoming contaminated water, two liquid-liquid mixers to disperse wetted solid Bentonite and activated carbon powders in the incoming contaminated wastewater stream ahead of where the coagulating and flocculating chemicals are introduced, and four chemical feed systems for mixing bulk powdered chemicals into water and injecting them into the liquid-liquid mixers.

BRIEF DESCRIPTION OF THE DRAWINGS

FIG. 5A illustrates the horizontal flow of the fluid as it enters the mixer. FIG. 5B illustrates a vertical cutaway view of the mixer identifying major components and showing the flow of the fluids as they are being mixed.

FIG. 6 depicts the chemical powder mixing and feeding system and identifies basic system components. FIGS. 6–11 depict the chemical mixing and feeding system in various stages of operation.

FIG. 11 depict the distributor positioned in the mixing tank of the powder chemical wetting and feeding system.

FIGS. 13A and 13B provide three-dimensional illustrations of a typical radial-grooved ring and a venturi-orifice ring.

DESCRIPTION OF ILLUSTRATIVE EMBODIMENTS

Illustrative embodiments of the invention are described below as they might be employed in the use of the methods and apparatus for separating solids and trace organic fluids form other fluids, such as water or saltwater. In the interest of clarity, not all features or an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Further aspects and advantages of the various embodiments of the invention will become apparent from consideration of the following description and drawings.

Figure 1:
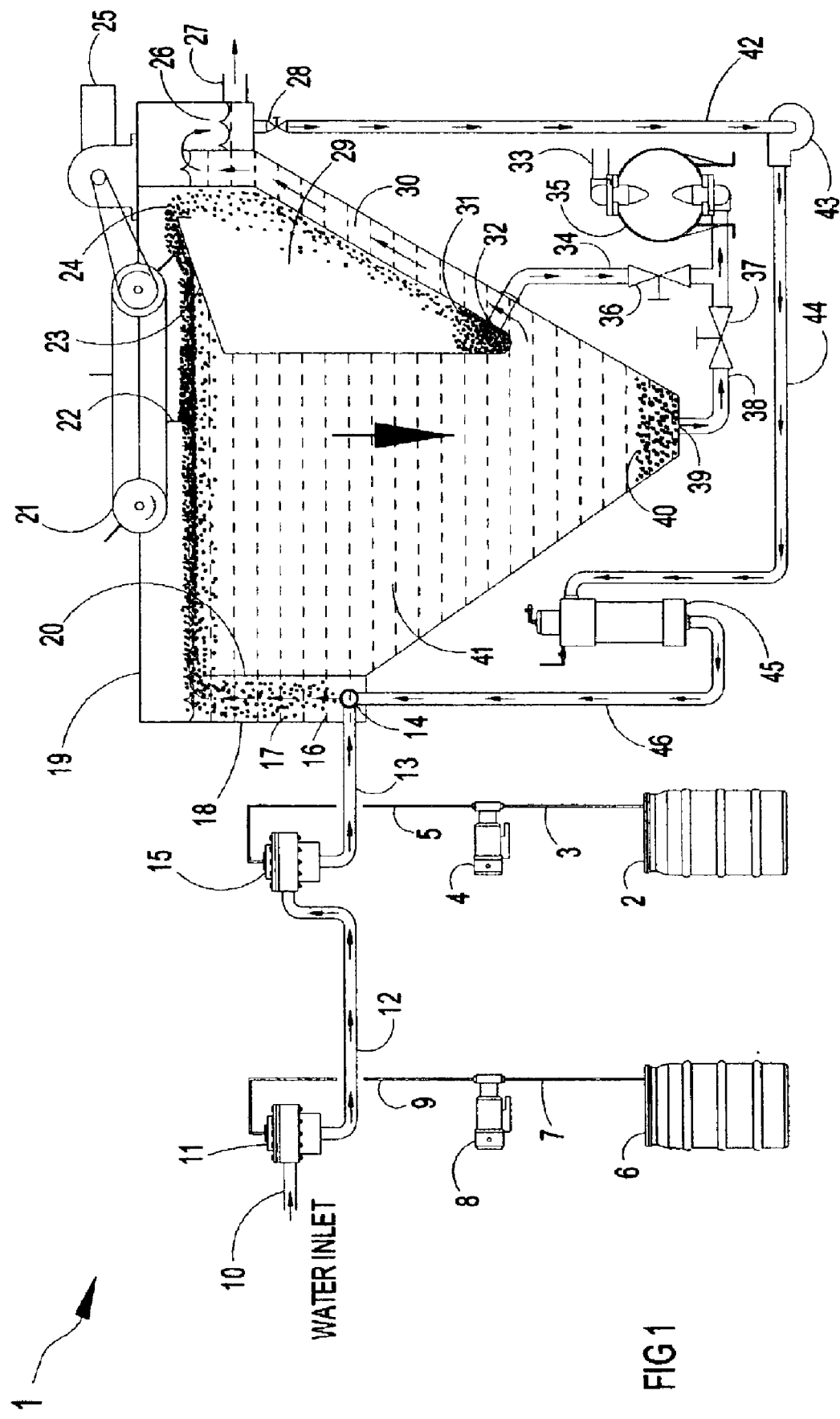
FIG. 1 depicts a schematic representation of a dissolved gas floatation clarifier system employing radial-grooved mixers to feed liquid chemicals into the stream of contaminated water and to dissolve the air used for separation of contaminants by floatation with a recycle pressure system used for aeration.

Referring now to the drawings in more detail, and particular to FIG. 1, therein is depicted in schematic representation a dissolved gas flotation clarifier system 1 employing a recycled pressure aeration system for separating suspended solids and trace organic fluids from an aqueous fluid, such as water or wastewater, by floatation in accordance with the present invention. The dissolved gas floatation clarifier system 1 consists of a water inlet 10 for the contaminated fluid to be clarified, a fluid mixer 11 for introduction of coagulation agents with a chemical feed pump 8 and chemical supply container 6, a second fluid mixer 15 for introduction of flocculating agents with a chemical feed pump 4 and chemical supply 2, a dissolved gas floatation (DGF) clarifier 19, and a recycle pressure aeration system with a recycling pump 43 and a fluid mixer applied as a dissolved gas generator 45.

The dissolved gas clarifier 19 consist an inlet manifold 14, a retention chamber 18 where the microscopic bubbles form and become attached to the contaminants, a floatation cell 41 to allow the contaminants to float with minimum turbulence, a rake assembly 21 with a series of rakes 22 and a variable speed drive 25 to skim the floating contaminants off the top of the water, a sludge collection chamber 29, a passageway 30 for the clarified water to exit the floatation cell 41, an outlet collection chamber 26, and a sludge pump 35 to remove the accumulated sludge 31 and 40.

The recycle pressure aeration system consists of a pump 43 to furnish the recycled water at the pressure required to dissolve the amount of gas needed for system operation, a fluid mixer applied as a dissolved gas generator 45 with a built in venturi to draw in the atmospheric air for dissolving into the water, and associated piping.

Wastewater (or water) containing suspended solids enters the dissolved gas floatation clarifier system 1 through the water inlet 10 under pressure and flows into the fluid mixer 11. A coagulating agent is drawn from container 6 by chemical feed pump 8 through piping 7 and injected into the fluid mixer 11 through piping 9 and thoroughly mixed with the incoming wastewater stream. The wastewater flows out of fluid mixer 11 through piping 12 and into fluid mixer 15. A flocculating agent is drawn from container 2 by chemical feed pump 4 through piping 3 and injected into fluid mixer 15 through piping 5 and thoroughly mixed with the incoming wastewater stream. The wastewater flows out of the fluid mixer 15 through piping 13 and into a manifold 14 where it is mixed with recycled clarified water saturated with dissolved air. The recycling pump 43 draws clarified water through shutoff valve 28 and piping 42, increases its pressure, and pumps the recycled water into a fluid mixer applied as a dissolved gas generator 45 where the water is saturated with air drawn from the atmosphere. The saturated recycled water flows out the dissolved gas generator 45 through piping 46 and into the manifold 14 where it is mixed with the incoming wastewater from piping 13. The mixture of water 16 is released in a retention chamber 18 where the air comes out of solution to form microscopic bubbles 17.

The time in the retention chamber 18 allows the coagulating and flocculating chemicals to form larger suspended solid particles with microscopic bubbles attached that causes them to float. The wastewater flows upward in the retention chamber 18 and over a weir 20 into the floatation cell 41. A rake assembly 21 skims the surface of the water with a series of individual racks 22 and carries the solids up an incline 23 and allows them to spill over 24 into a sludge collection chamber 29 separating the floating suspended solids from the water.

The rake assembly 21 is driven by a variable speed drive 25. A small percentage of the suspended solids 40 settle to the bottom of the floatation cell 41. The clarified water flows downward in the floatation cell 41 and up a passageway 30 and spills over into an outlet collection chamber 26. Some of the clarified water is recycled through shutoff valve 28 and saturated to supply the air bubbles for floatation as previously described. The remainder of the clarified water is discharged from the dissolved gas floatation clarifier system 1 through the outlet 27. The sludge 31 in the sludge collection chamber 29 and the sludge 40 settled in the bottom of the floatation cell 41 are periodically removed. The sludge is removed from the sludge chamber 29 by turning the sludge pump 35 on and opening the selection valve 36. The sludge 31 is drawn by the sludge pump 35 through the sludge outlet 32 and piping 34 when selection valve 36 is opened and discharged from the system through pump outlet 33. The sludge 40 settled on the bottom of the floatation cell 41 is drawn by the sludge pump 35 through the sludge outlet port 39 and piping 38 when selection valve 37 is opened and is discharged from the system through pump outlet 33.

Figure 2:
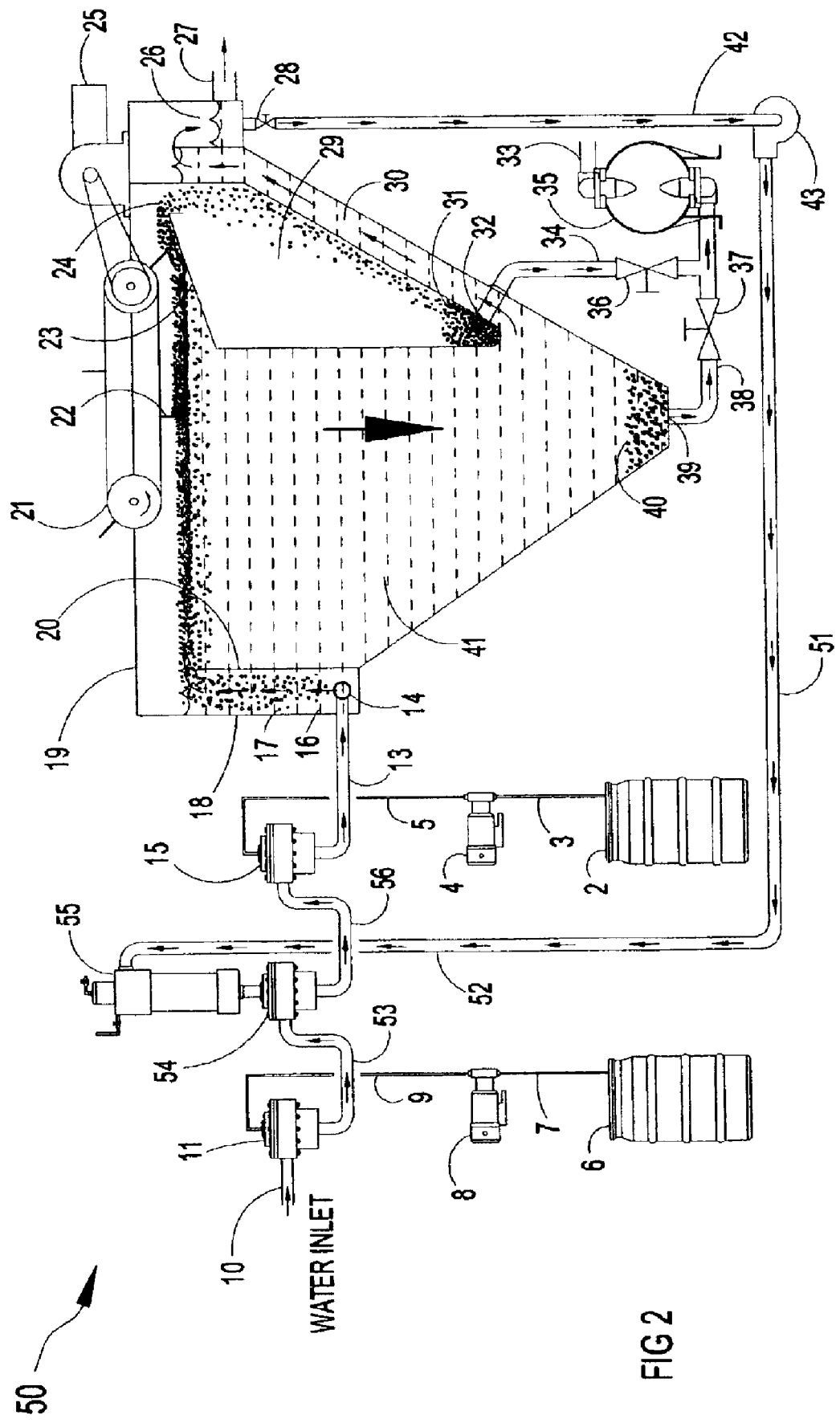
FIG. 2 depicts a schematic representation of a dissolved gas floatation clarifier system employing radial-grooved mixers to feed both liquid and solid chemicals into the stream of contaminated water and to dissolve the air used for separation of contaminants by floatation with a recycle pressure system used for aeration. The system also employs a chemical feed system for dissolving and wetting powdered bulk chemicals used in treating the contaminated water.

FIG. 2 depicts in schematic representation a second embodiment of a dissolved gas flotation clarifier system 50 employing another recycle pressure aeration system for separating suspended solids and trace organic fluids in accordance with the present invention. The dissolved gas floatation clarifier system 50 consists of a water inlet 10 for the contaminated wastewater to be clarified, an inline fluid mixer 11 for introduction of coagulation agents with a chemical feed pump 8 and chemical supply container 6, a second inline fluid mixer 54 for introduction of dissolved air from the recycled pressure aeration system for flotation, a third inline fluid mixer 15 for introduction of flocculating agents with a chemical feed pump 4 and chemical supply 2, a dissolved gas floatation (DGF) clarifier 19, and a recycle pressure aeration system with a recycling pump 43 and a fluid mixer applied as a dissolved gas generator 55 connected to the second inline fluid mixer 54.

The dissolved gas clarifier 19 consist an inlet manifold 14, a retention chamber 18 where the microscopic bubbles form and become attached to the contaminants, a floatation cell 41 to allow the contaminants to float with minimum turbulence, a rake assembly 21 with a series of rakes 22 and a variable speed drive 25 to skim the floating contaminants off the top of the water, a sludge collection chamber 29, a passageway 30 for the clarified water to exit the floatation cell 41, an outlet collection chamber 26, and a sludge pump 35 to remove the accumulated sludge 31 and 40.

The recycle pressure aeration system consists of a pump 43 to furnish the recycled water at the pressure required to dissolve the amount of gas needed for system operation, a fluid mixer applied as a dissolved gas generator 55 with a built in venturi to draw in the atmospheric air for dissolving into the water, and associated piping.

Wastewater (or water) containing suspended solids enters the dissolved gas floating clarifier system 50 through the water inlet 10 under pressure and flows into the first inline fluid mixer 11. A coagulating agent is drawn from container 6 by chemical feed pump 8 through piping 7 and injected into the fluid mixer 11 through piping 9 and thoroughly mixed with the wastewater stream. The wastewater flows out of fluid mixer 11 through line 53 and into the second inline fluid mixer 54 where the dissolved air used for flotation is introduced.

Clarified water is drawn through shutoff valve 28 and line 42 by the recycling pressure pump 43 and pumped through lines 51 and 52 into the fluid mixer applied as a dissolved gas generator 55 and saturated with air drawn from the atmosphere. The recycled water saturated with air flows out the bottom of the dissolved gas generator 55 and into inline fluid mixer 54 where it is mixed with the incoming wastewater. The wastewater with the dissolved air flows out of fluid mixer 54 through line 56 and into the fluid mixer 15. A flocculating agent is drawn from container 2 by chemical feed pump 4 through piping 3 and injected into fluid mixer 15 through piping 5 and thoroughly mixed with the incoming wastewater stream. The wastewater flows out of the fluid mixer 15 through piping 13 and into a manifold 14. The wastewater flows out of the fluid mixer 15 through piping 13 and into the manifold 14 where the mixture of chemicals, dissolve air, and wastewater 16 is released in a retention chamber 18 where the air comes out of solution to form microscopic bubbles 17.

The time in the retention chamber 18 allows the coagulating and flocculating chemicals to form larger suspended solid particles with microscopic bubbles attached that causes them to float. The water flows upward in the retention chamber 18 and over a weir 20 into the floatation cell 41. A rake assembly 21 skims the surface of the water with a series of individual racks 22 and carries the solids up an incline 23 and allows them to spill over 24 into a sludge collection chamber 29 separating the floating suspended solids from the water.

The rake assembly 21 is driven by a variable speed drive 25. A small percentage of the suspended solids 40 settle to the bottom of the floatation cell 41. The clarified water flows downward in the floatation cell 41 and up a passageway 30 and spills over into an outlet collection chamber 26. Some of the clarified water is recycled through shutoff valve 28 and saturated to supply the air bubbles for floatation as previously described. The remainder of the clarified water is discharged from the dissolved gas floatation clarifier system 1 through the outlet 27. The sludge 31 in the sludge collection chamber 29 and the sludge 40 settled in the bottom of the floatation cell 41 are periodically removed. The sludge is removed from the sludge chamber 29 by turning the sludge pump 35 on and opening the selection valve 36.

The sludge 31 is drawn by the sludge pump 35 through the sludge outlet 32 and piping 34 when selection valve 36 is opened and discharged from the system through pump outlet 33. The sludge 40 settled on the bottom of the floatation cell 41 is drawn by the sludge pump 35 through the sludge outlet port 39 and piping 38 when selection valve 37 is opened and is discharged from the system through pump outlet 33.

Figure 3:
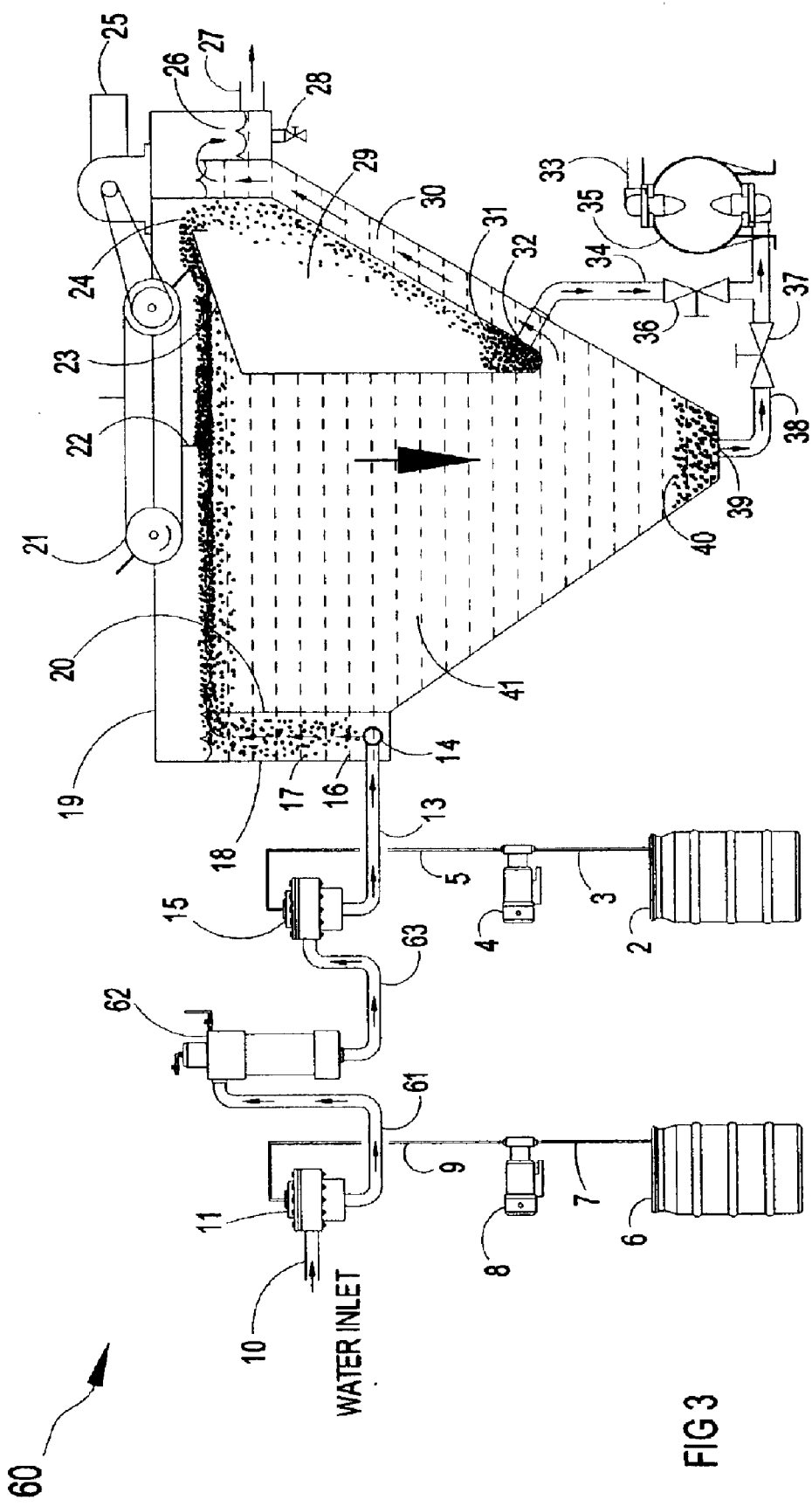
FIG. 3 depicts a schematic representation of a dissolved gas floatation clarifier system employing radial-grooved mixers to feed both liquid and solid chemicals into the stream of contaminated water and to dissolve the air used for separation of contaminants by floatation with a full-stream pressure system used for aeration. The system also employs a chemical feed system for dissolving and wetting powdered bulk chemicals used in treating the contaminated water.

FIG. 3 depicts in schematic representation a third embodiment of a dissolved air clarifier system 60 employing a full stream pressure aeration system for separating suspended solids and trace organic fluids in accordance with the present invention. The dissolved gas floatation clarifier system 60 consists of a water inlet 10 for the contaminated wastewater to be clarified, an inline fluid mixer 11 for introduction of coagulation agents with a chemical feed pump 8 and chemical supply container 6, a second inline fluid mixer applied as a dissolved gas generator 62 for introduction of dissolved air in the full incoming wastewater stream for flotation, a third inline fluid mixer 15 for introduction of flocculating agents with a chemical feed pump 4 and chemical supply 2, and a dissolved gas floatation (DGF) clarifier 19.

The dissolved gas clarifier 19 consist an inlet manifold 14, a retention chamber 18 where the microscopic bubbles form and become attached to the contaminants, a floatation cell 41 to allow the contaminants to float with minimum turbulence, a rake assembly 21 with a series of rakes 22 and a variable speed drive 25 to skim the floating contaminants off the top of the water, a sludge collection chamber 29, a passageway 30 for the clarified water to exit the floatation cell 41, an outlet collection chamber 26, and a sludge pump 35 to remove the accumulated sludge 31 and 40.

Wastewater containing suspended solids enters the dissolved gas floating clarifier system 60 through the water inlet 10 under pressure and flows into the first inline fluid mixer 11. A coagulating agent is drawn from container 6 by chemical feed pump 8 through piping 7 and injected into the fluid mixer 11 through piping 9 and thoroughly mixed with the wastewater stream.

The wastewater flows out of fluid mixer 11 through line 61 and into second inline fluid mixer applied as a dissolved gas generator 62 where the dissolved air used for flotation is introduced. The wastewater with the dissolved air flows out of fluid mixer 62 through line 63 and into the fluid mixer 15. A flocculating agent is drawn from container 2 by chemical feed pump 4 through piping 3 and injected into fluid mixer 15 through piping 5 and thoroughly mixed with the wastewater stream.

The wastewater flows out of the fluid mixer 15 through piping 13 and into the manifold 14 where the mixture of chemicals, dissolve air, and water 16 is released in a retention chamber 18 where the air comes out of solution to form microscopic bubbles 17. The time in the retention chamber 18 allows the coagulating and flocculating chemicals to form larger suspended solid particles with microscopic bubbles attached that causes them to float.

The water flows upward in the retention chamber 18 and over a weir 20 into the flotation cell 41. A rake assembly 21 skims the surface of the water with a series of individual racks 22 and carries the solids up an incline 23 and allows them to spill over 24 into a sludge collection chamber 29 separating the floating suspended solids from the water. The rake assembly 21 is driven by a variable speed drive 25. A small percentage of the suspended solids 40 settle to the bottom of the floatation cell 41. The clarified water flows downward in the floatation cell 41 and up a passageway 30 and spills over into an outlet collection chamber 26. The clarified water is discharged from the dissolved gas floatation clarifier system 1 through the outlet 27.

The sludge 31 in the sludge collection chamber 29 and the sludge 40 settled in the bottom of the floatation cell 41 are periodically removed. The sludge is removed from the sludge chamber 29 by turning the sludge pump 35 on and opening the selection valve 36. The sludge 31 is drawn by the sludge pump 35 through the sludge outlet 32 and piping 34 when selection valve 36 is opened and discharged from the system through pump outlet 33. The sludge 40 settled on the bottom of the floatation cell 41 is drawn by the sludge pump 35 through the sludge outlet port 39 and piping 38 when selection valve 37 is opened and is discharged from the system through pump outlet 33.

When a large amount of coagulating and flocculating agents are to be used, costs can be greatly reduced by purchasing the chemicals in the solid phases and dissolving them in water for feeding into the wastewater stream. In addition, when trace organic and dissolved metals are also to be removed, solid chemical powders that do not dissolve and remain as solids, such as Bentonite clays and activated carbon, may be used to remove the contaminants by feeding them into the wastewater stream ahead of the dissolved gas floatation clarifier. The chemical powders must be wetted and dispersed in water before being fed into the wastewater stream.

Figure 4:
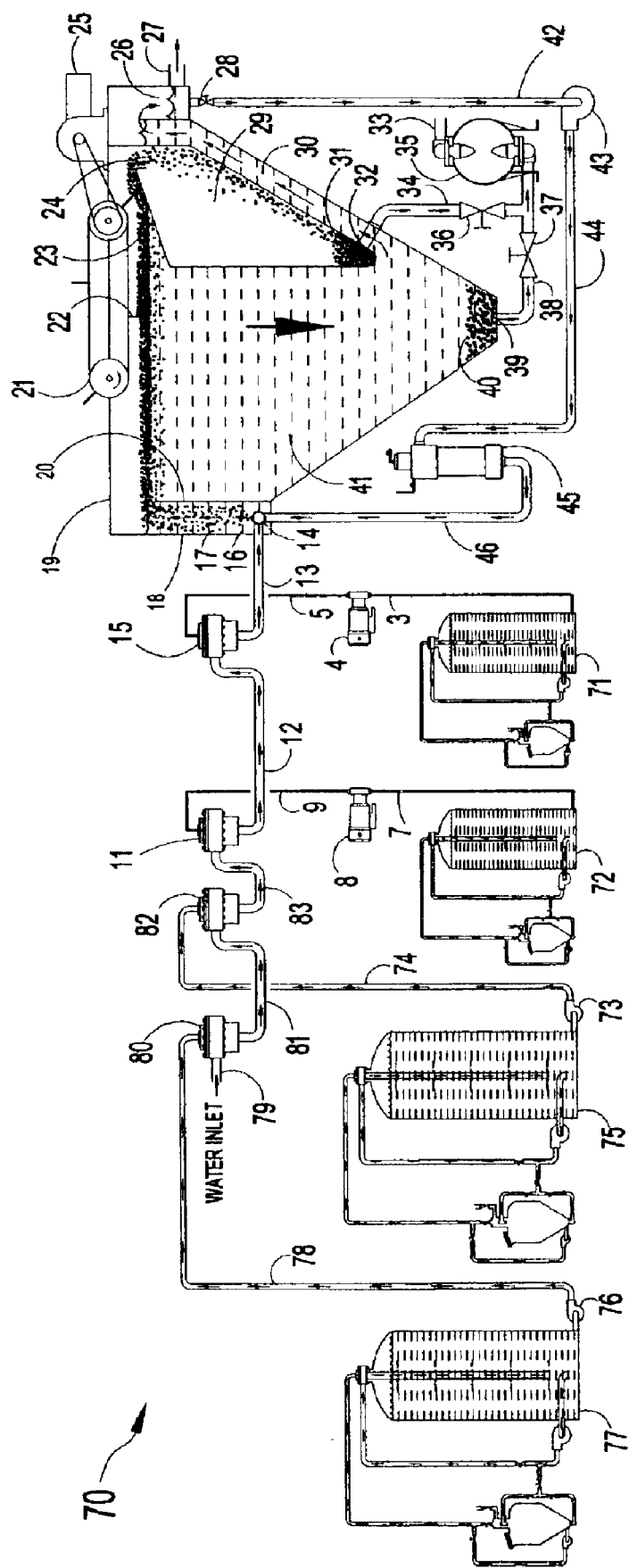
FIG. 4 depicts in schematic representation of another embodiment of a dissolved gas floatation clarifier system 70 in which all solid chemicals are used in the treatment of wastewater.

FIG. 4 depicts in schematic representation of another embodiment of a dissolved gas floatation clarifier system 70 in which all solid chemicals are used in the treatment of wastewater. The dissolved gas floatation clarifier system 70 consists of a water inlet 79 for contaminated wastewater treatment, a fluid mixer 80 for introduction of Bentonite with a feed pump 76 and a powder wetting and mixing system 77, a second fluid mixer 82 for introduction of activated carbon with a feed pump 73 and a powder wetting and mixing system 75, a third fluid mixer 11 for introduction of a coagulating agent with a feed pump 8 and a coagulating agent dissolving and mixing system 72, a fourth fluid mixer 15 for introduction of a flocculating agent with a feed pump 4 and a flocculating agent dissolving and mixing system 71, a dissolved air floatation clarifier 19, and a recycle pressure aeration system with a recycling pump 43 and a fluid mixer applied as a dissolved gas generator 45. The dissolved gas floatation clarifier 19 and the recycle pressure aeration system are as described in the discussions of FIG. 1.

Wastewater containing suspended solids enters the dissolved gas floatation clarifier system 47 under pressure and flows into the fluid mixer 80. The Bentonite clay dispersed in water is drawn by the feed pump 76 from the Bentonite wetting and mixing system 77 and pumped through piping 78 into fluid mixer 80 and thoroughly mixed with the incoming wastewater stream.

The wastewater flows out of fluid mixer 80 through piping 81 and into fluid mixer 82. The activated carbon dispersed in water is drawn by feed pump 73 from the activated carbon wetting and mixing system 75 and pumped through piping 74 into fluid mixer 82 and thoroughly mixed with the wastewater stream. The wastewater flows out of fluid mixer 82 through piping 83 and into fluid mixer 11. A coagulating agent is drawn from the dissolving and mixing system 72 by chemical feed pump 8 through piping 7 and injected into the fluid mixer 11 through piping 9 and thoroughly mixed with the wastewater stream.

The wastewater flows out of fluid mixer 11 through piping 12 and into fluid mixer 15. A flocculating agent is drawn from the dissolving and mixing system 71 by chemical feed pump 4 through piping 3 and injected into fluid mixer 15 through piping 5 and thoroughly mixed with the wastewater stream. As described in the preceding discussion, the wastewater flows out of the fluid mixer 15 through piping 13 and into a manifold 14 where it is mixed with recycled clarified water saturated with dissolved air. The recycling pump 43 through shutoff valve 28 and piping 42 draws clarified water, increases its pressure, and pumps the cycled water into a fluid mixer applied as a dissolved gas generator 45 where the water is saturated with air drawn from the atmosphere.

The saturated recycled water flows out the dissolved gas generator 45 through piping 46 and into the manifold 14 where it is mixed with the incoming wastewater from piping 13. The mixture of water 16 is released in a retention chamber 18 where the air comes out of solution to form microscopic bubbles 17. The time in the retention chamber 18 allows the coagulating and flocculating chemicals to form larger suspended solid particles with microscopic bubbles attached that causes them to float. The water flows upward in the retention chamber 18 and over a weir 20 into the floatation cell 41.

A rake assembly 21 skims the surface of the water with a series of rakes 22 and carries the solids up an incline 23 and allows them to spill over 24 into a sludge collection chamber 29 separating the floating suspended solids from the water. The rake 21 is driven by a variable speed drive 25. A small percentage of the suspended solids 40 settle to the bottom of the floatation cell 41. The clarified water flows downward in the floatation cell 41 and up a passage 30 and spills over into an outlet collection chamber 26. Some of the clarified water is recycled through shutoff valve 28 and saturated to supply the air bubbles for floatation as previously described. The remainder of the clarified water is discharged from the dissolved gas floatation clarifier system 47 through the outlet 27.

The sludge 31 in the sludge collection chamber 29 and the sludge 40 settled in the bottom of the floatation cell 41 are periodically removed. The sludge is removed from the sludge chamber 29 by turning the sludge pump 35 on and opening the selection valve 36. The sludge 31 is drawn by the sludge pump 35 through the sludge outlet 32 and piping 34 when selection valve 36 is opened and discharged from the system through pump outlet 33. The sludge 40 settled on the bottom of the floatation cell 41 is drawn by the sludge pump 35 through the sludge outlet port 39 and piping 38 when selection valve 37 is opened and is discharged from the system through pump outlet 33.

The fluid mixers 11, 15, 45, 55, 62, 80, and 82 used as liquid-to-liquid mixers and dissolved gas generators may correspond structurally and functionally to the radial-grooved ring mixer disclosed in co-pending patent application Ser. No. 09/879,496, filed Jun. 12, 2001, now U.S. Pat. No. 6,669,843, in the name of Johnny Arnaud and assigned to the same assignee as the present application. The fluid mixers applied as liquid-to-liquid mixers and as dissolved gas generators are shown in FIGS. 1–4. While the radial-grooved ring mixers are described herein, the foregoing co-pending application is hereby incorporated herein by reference and can be referred to for further structural detail.

Figure 5A:
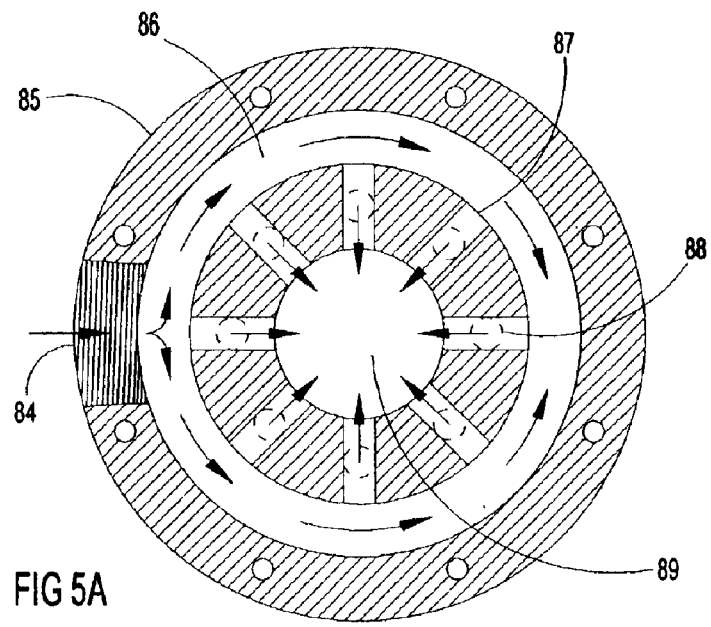
FIGS. 5A and 5B depict a fluid mixer in accordance with the present invention.
Figure 5B:
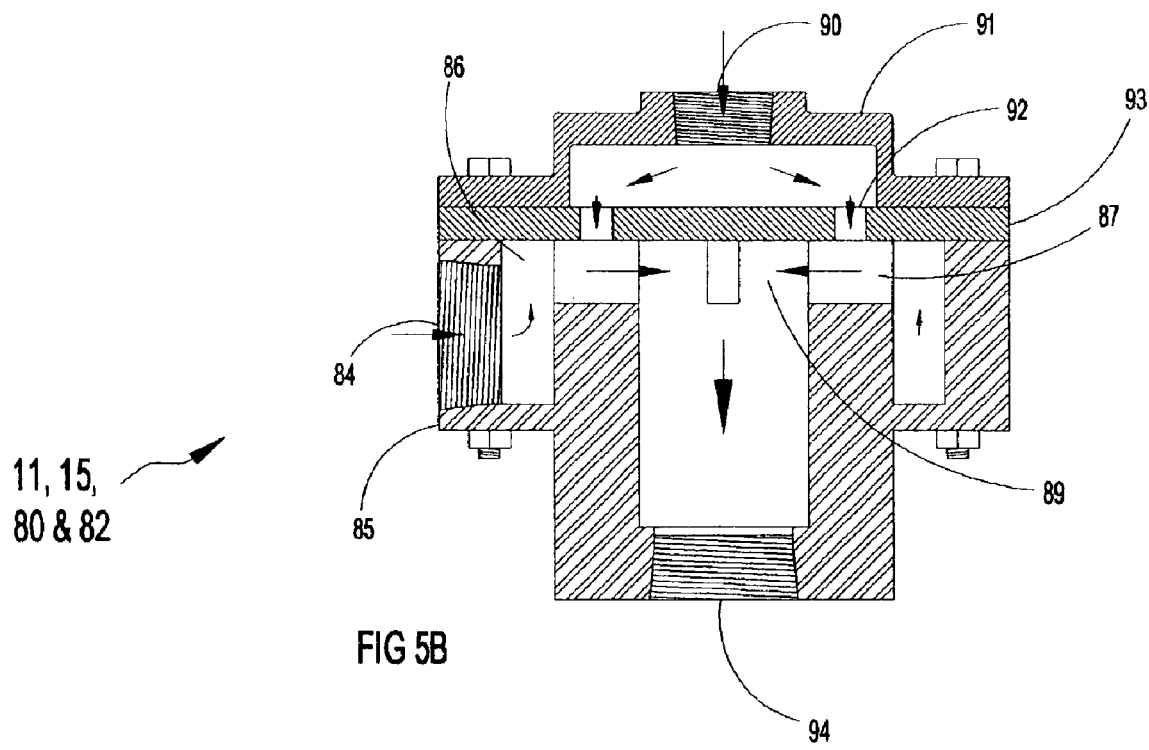

FIGS. 5A and 5B illustrate the mixer 11, 15, 80, or 82 in FIGS. 1–4. FIG. 5A depicts a horizontal cross-sectional view of the liquid inlet to the mixer 11, 15, 80, or 82 illustrating the radial-groove ring 85, the distribution channel 86, the eight radial grooves 87, the position of the orifices 88 over the radial grooves 87, and an impact zone 89 to which radial grooves 87 are directed. FIG. 5B provides a vertical cross-sectional view of the fluid mixer 11, 15, 80, or 82 assembly consisting of top inlet housing 91, an orifice plate 93 with orifices 92, a radial-grooved ring 85, and an impact zone 89. The arrows indicate the direction of fluid flow.

The wastewater enters the fluid mixer 11, 15, 80, or 82 through the side inlet 84, flows around the distribution channel 86, and is injected at high velocity through the radial grooves 87 and mixed with the chemical (coagulant, flocculent, Bentonite, of activated carbon) entering from the top inlet 90 and through the orifices 92. The two fluids are then discharged into the impact zone 89 to become thoroughly mixed. The mixture of fluids exits the fluid mixer through the outlet 94.

Figure 6:
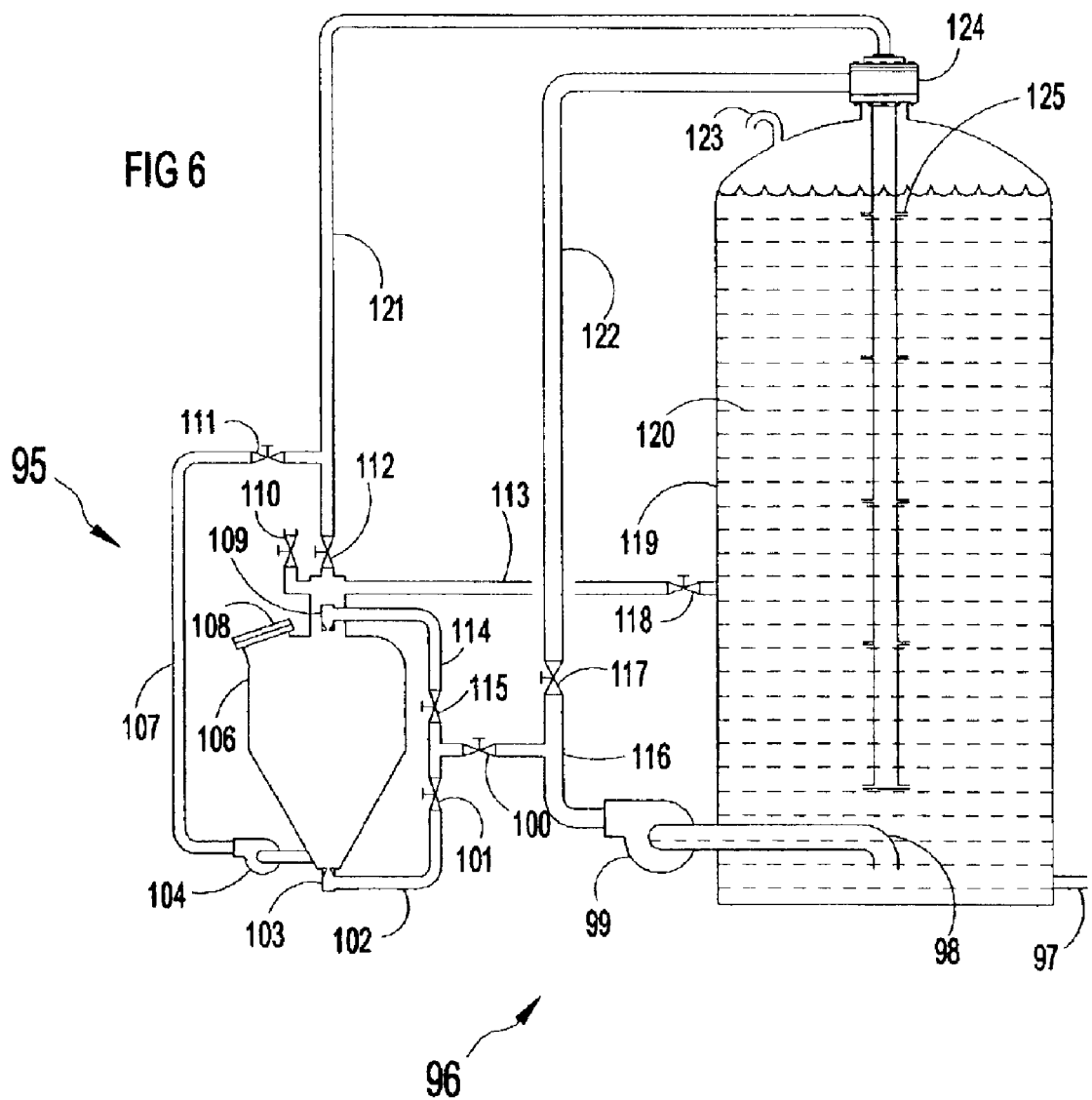
FIGS. 6–10 are schematic representations of a powder chemical wetting and feeding system in accordance with the present invention.

FIGS. 6–11 depict a system 71, 72, 75, or 77 for mixing chemicals in powder or granular form in liquid so they can be fed into the contaminated wastewater stream that is to be treated and clarified. The chemical mixing system 71, 72, 75, or 77 combines the mixing system for dry powders disclosed in U.S. Pat. No. 6,254,267 with the fluid mixer disclosed in co-pending patent application Ser. No. 09/879,496 referenced above, now U.S. Pat. No. 6,669,843. FIG. 6 depicts the chemical powder and liquid mixing system 71, 72, 75, or 77 and identifies basic system components for a particular embodiment of the present invention. FIGS. 6–11 depict the system 71, 72, 75, or 77 during various stages of operation. The chemical mixing system 71, 72, 75, or 77 consists of a dry powder mixing system 95 for dissolving solid chemicals that go into solution when mixed with water, such as coagulants and flocculants, and for wetting and dispersing solid chemicals that remain as solids in water, such as Bentonite and activated carbon, and a fluid mixing system 98 for diluting and continuously stirring chemicals to the level needed for wastewater treatment based on the amount of contamination present.

The dry powder mixing system 95 consists of a wetting housing 106 with an access port 107; a nozzle 108 in the upper part of the wetting housing 106; a second nozzle 103 in the lower part of the wetting housing 106; three valves 100, 101, and 114 with associated piping 102 and 114 to control the incoming water to the nozzles 103 and 109; an outlet pump 104 with associated piping 107 and a shutoff valve 111 to transfer the chemical-water mixture out of the wetting housing 106; and outlet valve 112 connected to the upper part of the housing 106 with associated piping 121 connected to the fluid mixing system 96; a fill line 113 and valve 118; and a vent valve 110.

The fluid mixing system 96 consists of a tank 119 with an outlet port 97 and a vent port 123; a fluid mixer 124 mounted on top of the tank 119; distributors 125 positioned in the center of the tank 119; and a circulation pump 99 with a suction line 98, a shutoff valve 117, and piping 116 and 122 connecting the pump 99 to the fluid mixer 124.

Figure 7:
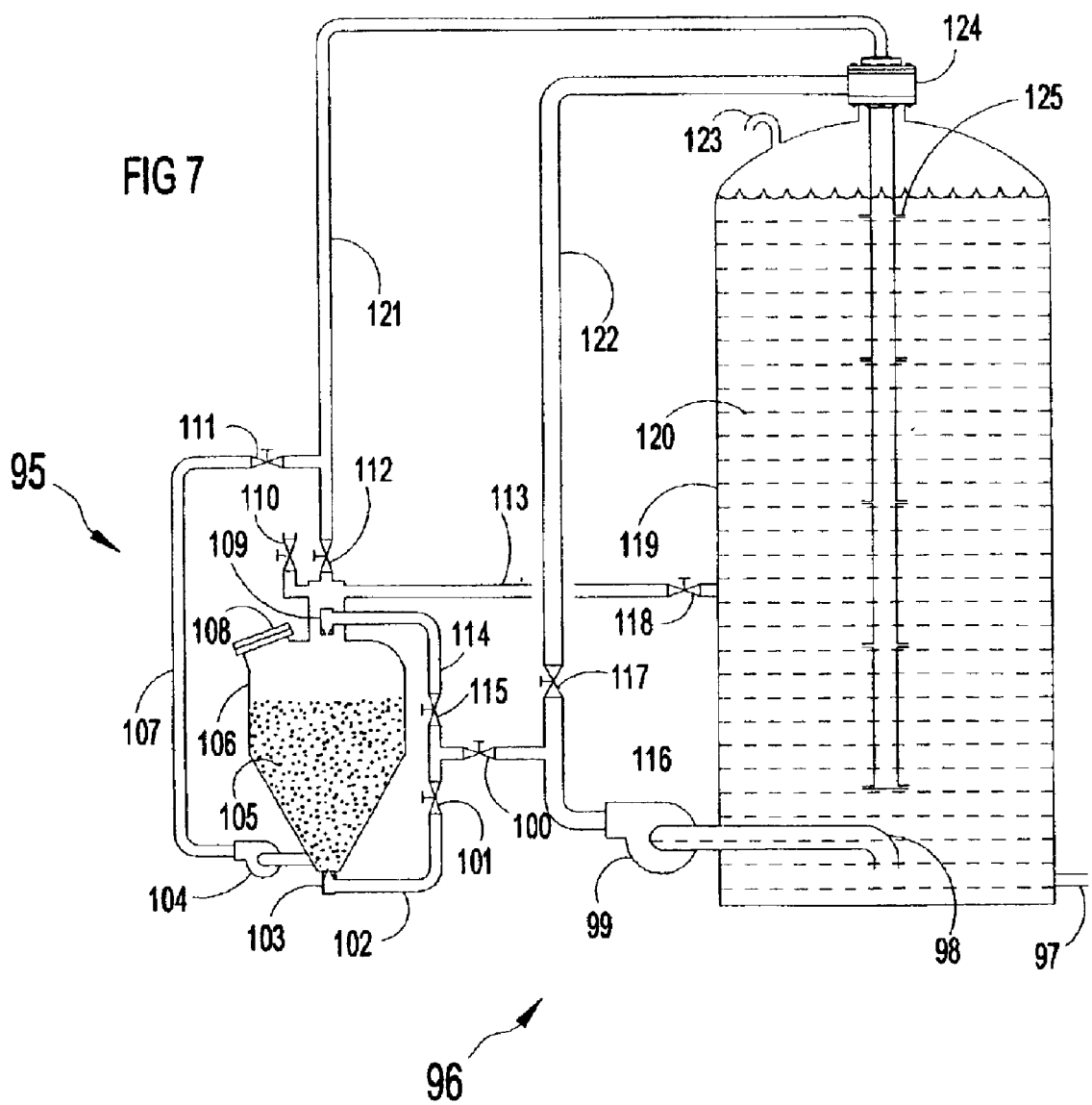

Referring to FIG. 7, in operation dry chemicals in powder or granular form 105 is placed in the wetting container 106 through the access port 108.

Figure 8:
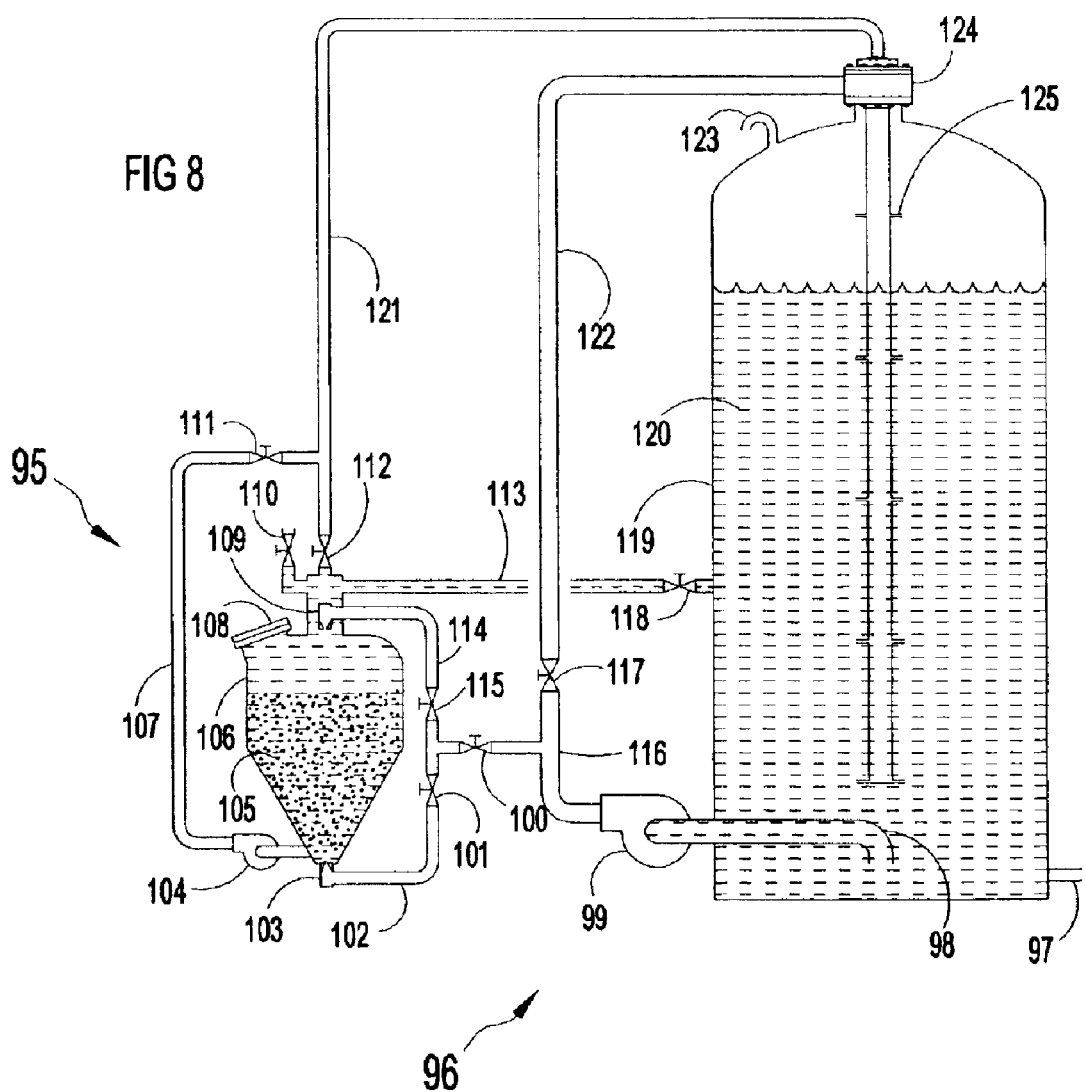

Referring to FIG. 8, with outlet pump 104 turned off and shutoff valve 111 closed and the vent valve 110 and fill valve 118 opened, the wetting tank 106 is filled with water 120 from mixing tank 119 through piping 113. When the wetting tank 106 is full, vent valve 100 and fill valve 118 are closed.

Figure 9:
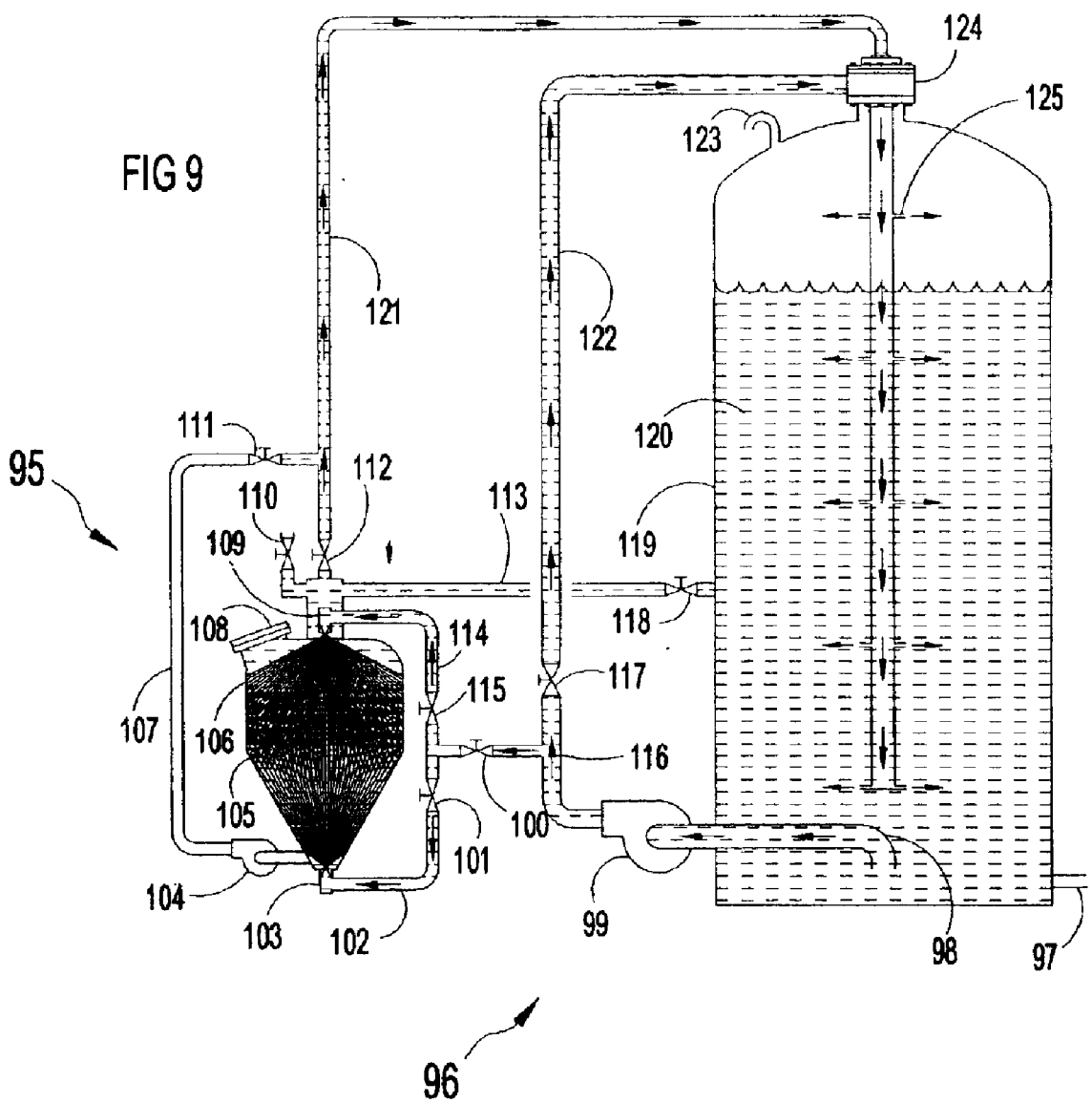

Referring to FIG. 9, with upper outlet valve 112; inlet valves 100, 101, and 115; and outlet valve 117 opened, circulating pump 99 is turned on. The arrows indicate the direction of flow. Water 120 is drawn from tank 119 by circulating pump 99 through suction pipe 98 and pumped through piping 122 and fluid mixer 124 and dispersed and mixed with existing water 120 in tank 119 by distributors 125 positioned at various levels in the center of tank 119. Valve 117 in circulating line 122 is partially closed and water flows through valve 100 then divided into two streams to flow to the upper nozzle 109 and lower nozzle 103.

Adjusting inlet valves 101 and 115 controls the amount of water directed to the nozzles 103 and 109. The swirling spray of lower nozzle 103 lifts and wets or dissolves the lower part of powder 105 as the water flows upward and out through outlet valve 112, The swirling spray of upper nozzle 109 intercepts the dry powder as it flows upward. The swirling water sprayed in apposing directions wets and mixes the chemical powder with the water. The chemicals that dissolve in the water continue to flows upward out the wetting container 106 with the water and flow to the fluid mixer 124 where they are thoroughly mixed with the circulating water from piping 122 then dispersed throughout the existing water 120 in tank 119 by the distributors 125. The heavy chemicals that do not dissolve remain in the wetting container 106 as solids and become thoroughly wet.

Figure 10:
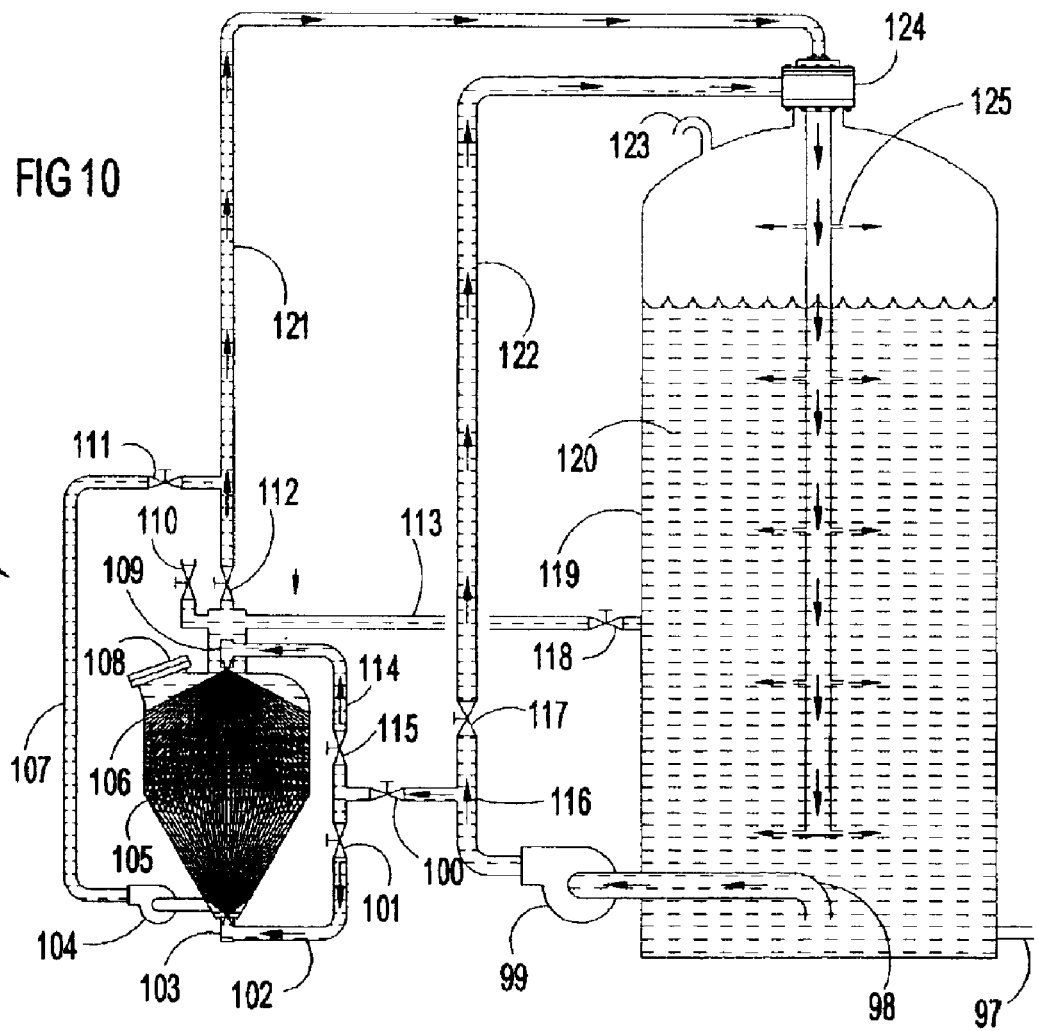

Referring to FIG. 10, to transfer the solids from the wetting container 106, outlet valve 111 is opened and outlet pump 104 is turned on. Outlet valve 112 at the top of the wetting chamber 106 is closed. The water and wetted powder is drawn by outlet pump 104 from the wetting container 106 and flows through piping 107, outlet valve 111, and piping 121 to the fluid mixer 124 where they are thoroughly mixed with the circulating water from piping 122 then disperse in the existing water 120 in tank 119 by the distributors 125. When all solids chemicals are removed from the wetting container 106, partially closed valve 117 is opened completely and valve 100 is closed to shutoff the water to the wetting container 106. Vent valve 110 is opened and all water in the wetting container 106 is transferred and mixed into the water 120 in the tank 119. When all water is out of the wetting container 106, outlet pump 104 is shutdown and vent valve 110 is closed.

Figure 11:
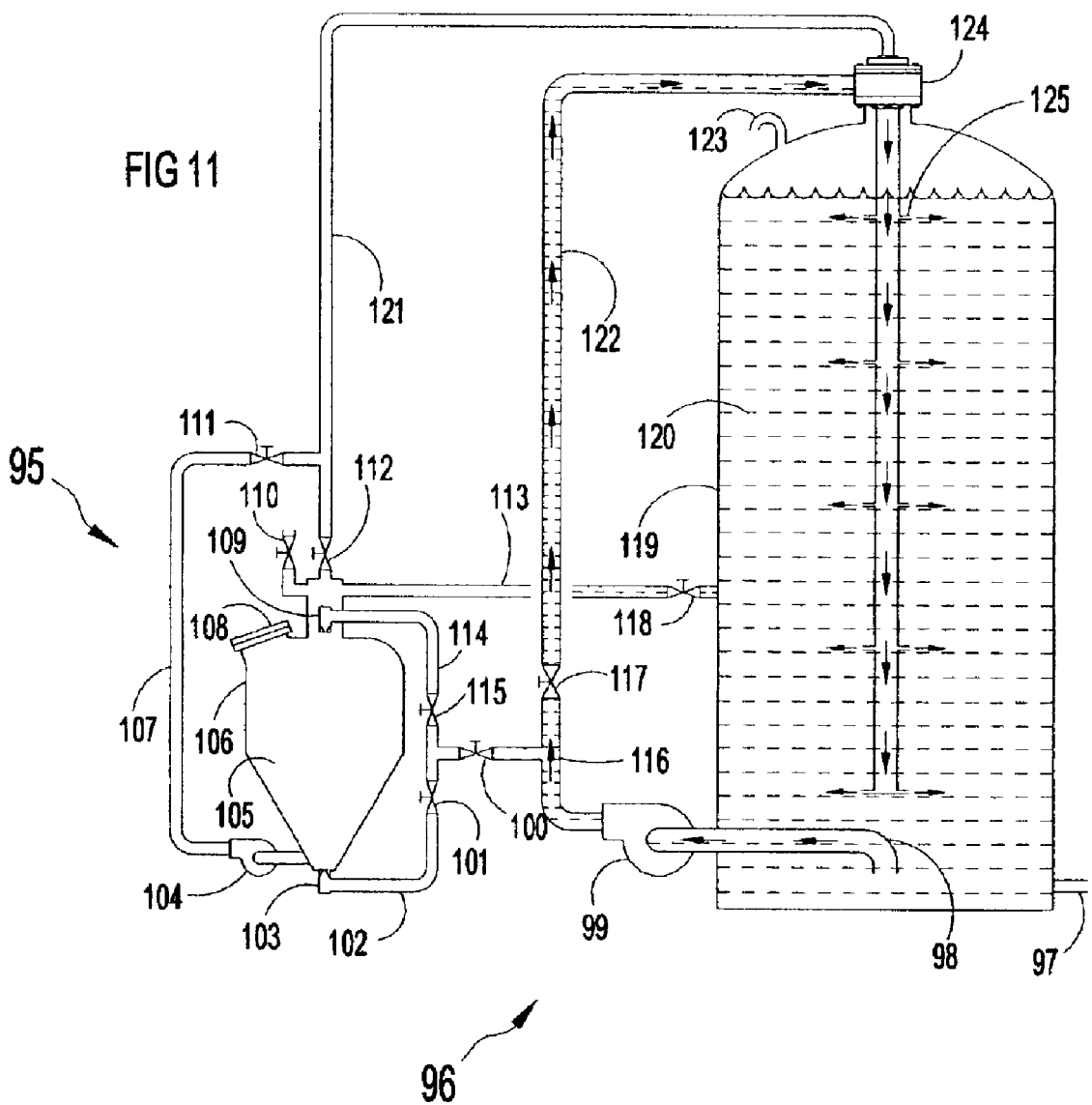

Referring to FIG. 11, with all water 120 returned to the tank 119, the circulating pump 99 continues to operate and keeps the chemicals dispersed in the water ready to be fed into the contaminated water that is to be treated.

Figure 12A:
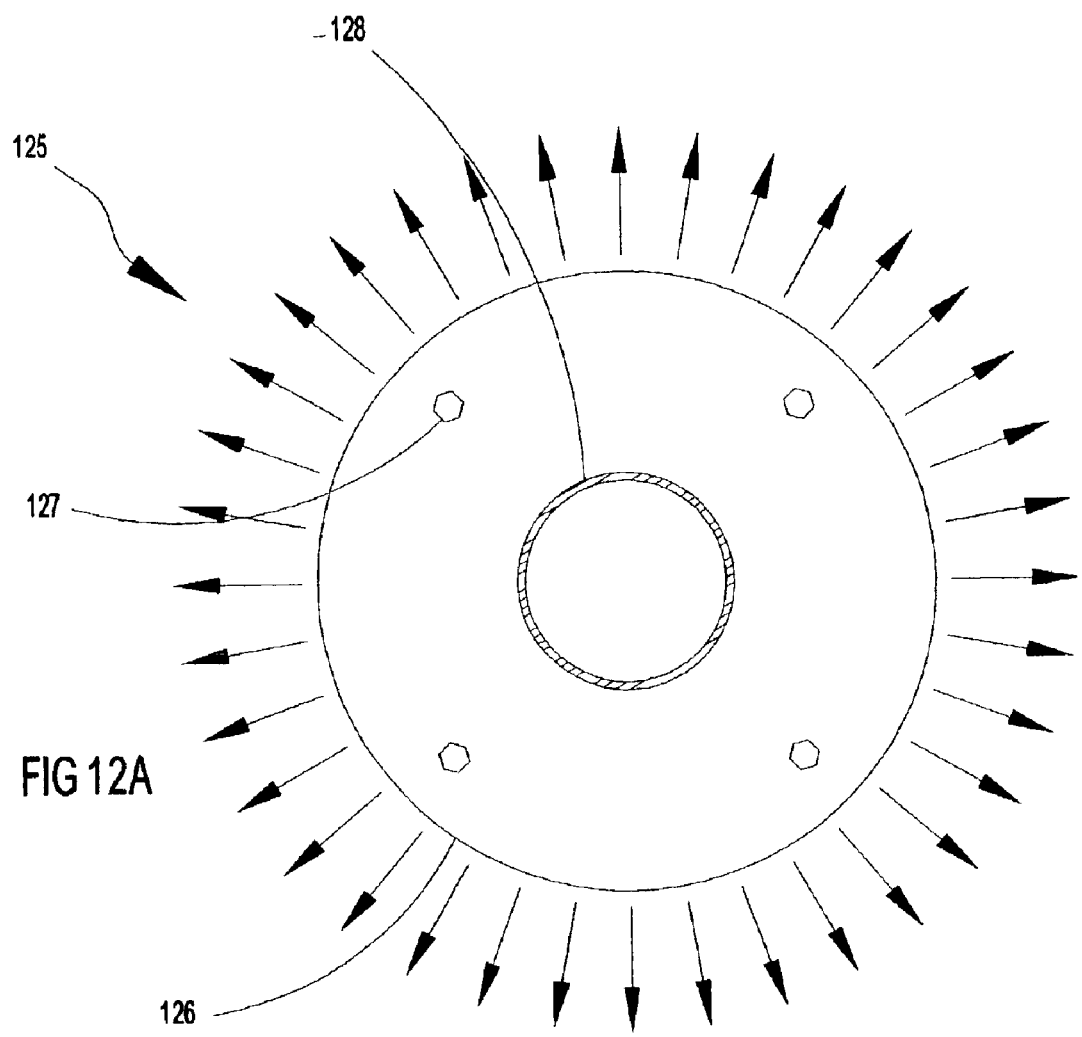
FIGS. 12A and 12B provide an illustration of a distributor of one embodiment of the present invention.
Figure 12B:
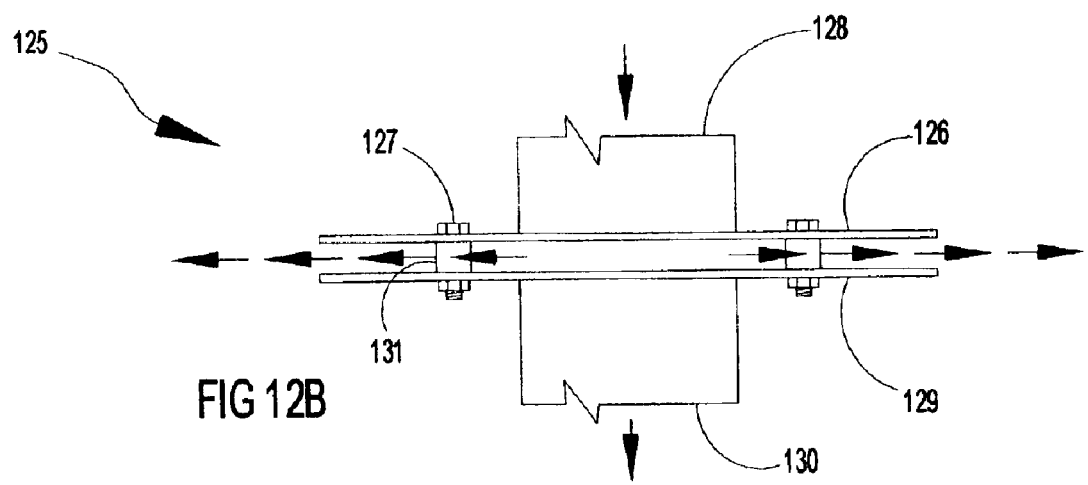

FIGS. 12A and 12B provide an illustration of the distributor 125 positioned at four levels in the mixing tank 119. The distributor 125 is simple in construction but very effective at dispersing the incoming fluid throughout the water 120 in the mixing tank 119. The distributor 125 consists of an inlet 128, a top disc 126, a bottom disc 129, bolts 127 to hold the top disc 126 and bottom disc 129 separated by a spacer 131, and an outlet 130. The arrows indicate the direction of fluid flow. The size of the spacer 131 determines how far apart the discs are maintained and the amount of fluid dispersed by the distributor 125 at any specific location in the mixing tank 119. The bottom outlet 130 allows fluid to continue flowing to the distributors lower in the mixing tank 119.

Figure 14:
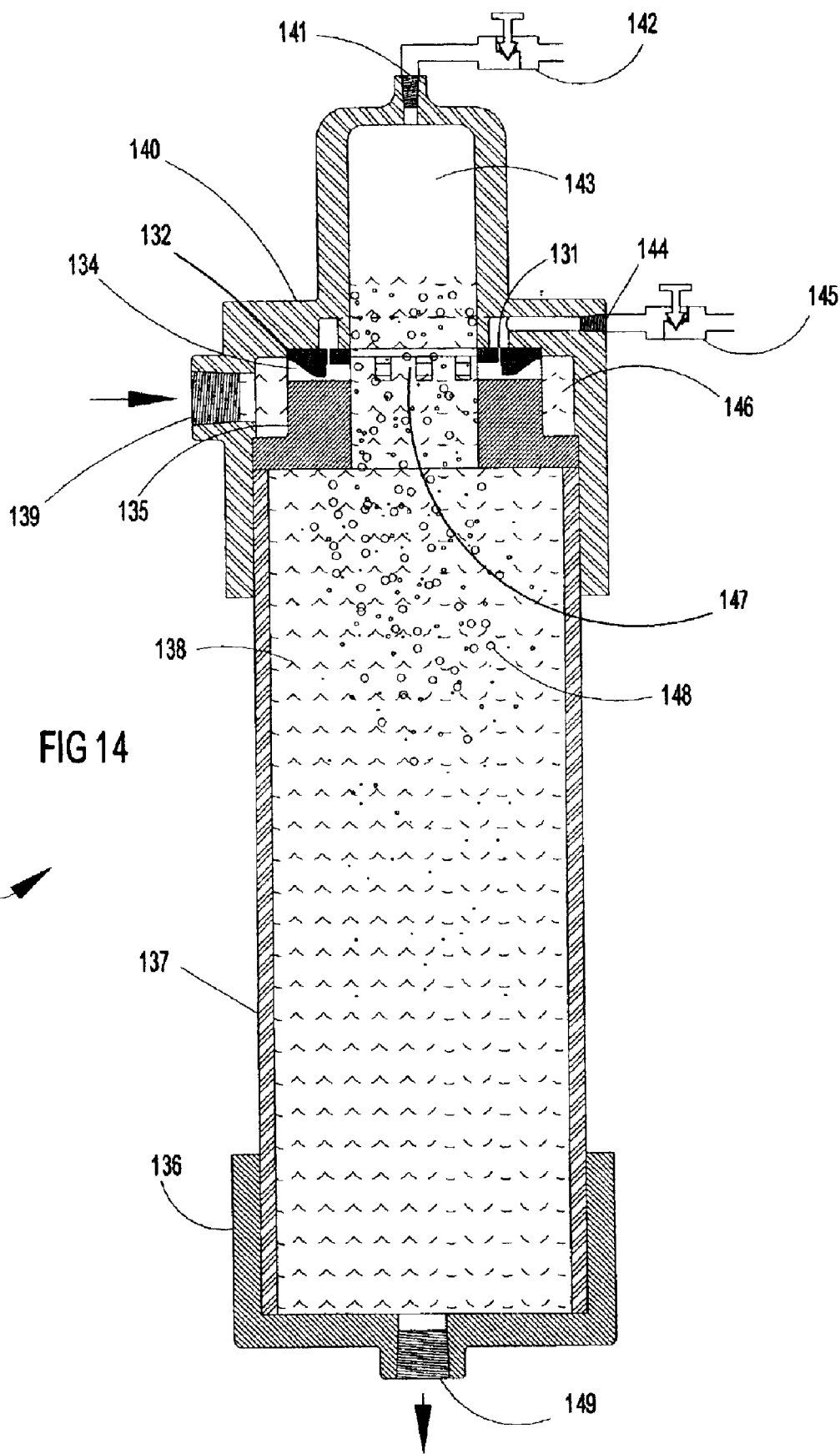
FIG. 14 shows a vertical cross-sectional view of a fluid mixer assembly of one embodiment of the present invention.

FIGS. 13A–14 depict a fluid mixer applied as a dissolved gas generator 45, 55, or 62 (FIGS. 1–4) employing dynamic forces of fluid flow obtained with a radial-grooved ring where atmospheric air or other low pressure gas is used as an oxygen supply and drawn into the mixer by venturi suction. FIGS. 13A and 13B provide three-dimensional illustrations of a typical radial-grooved ring 135 and a combination venturi-orifice ring 132 having 12 orifices 131 and 12 venturi 133 to fit into the radial grooves 134 of the radial-grooved ring 135.

FIG. 14 provides a vertical cross-sectional view of the fluid mixer 45, 55, or 64 assembly consisting of a cylindrical donut housing 140, a combination venturi-orifice ring 132, a radial-grooved ring 135, a lower cylinder 137, and a lower cap 136. The cylindrical donut housing 140 has a gas separation chamber 143 to separate excess gases from the liquids so the gases can by discharged while retaining the liquid. The center of the radial-grooved ring 135 serves as an impact zone 147 into which the multiple streams of the liquid-gas mixture flowing at high velocity are directed to collide with each other.

An inlet gas-metering valve 145 connected to the gas inlet 144 of the cylindrical donut housing 140 regulates the amount of gas supplied during operation. An outlet gas-metering valve 142 connected to the gas outlet 141 of the cylindrical donut housing 140 regulates the amount of gas discharged from the device during operation.

Referring to FIG. 14, the liquid enters through inlet 139 and flows into the distribution channel 146 around the radial-grooved ring 135. The liquid then flows through the radial grooves 134 where gas is drawn through the orifice ports 131 into each liquid stream as the liquid flows by the venturi. The liquid-gas mixture in each of the grooves 134 is then injected at high velocity into the impact zone 147 to collide with each other. The liquid becomes saturated with gas at this point. The inlet gas-metering valve 145 regulates the amount of gas supplied.

The saturated liquid 138 flows downward out of the impact zone 147 and into the larger area of the lower cylinder 137 where the velocity is decreased. The excess gas bubbles 148 flow upward and return to the impact zone 147. The saturated liquid continues to flow downward and exits through the outlet 149. The excess bubbles 148 flow up through the impact zone 147, and the gas is separated from the liquid in the separation chamber 143 and released from the unit through the outlet gas-metering valve 142.

The amount of gas retained in the separation chamber 143 regulates the liquid level in the apparatus. The amount of gas released is adjusted to maintain the liquid level just above the impact zone 147, and only a small amount of gas has to be released from the chamber 143. The fluid mixer 55 or 62 is extremely effective at saturating liquids with gases with only five parts that can be manufactured in many sizes at low cost. It can be manufactured in metal or in plastic either machined or injected molded.

What is claimed is:

1. A dissolved gas floatation clarifier system to separate contaminants from wastewater by floatation, comprising:
    a first fluid mixer in fluid communication with a wastewater inlet, the first mixer adapted to mix coagulation agents with wastewater from the wastewater inlet;
    a second fluid mixer adapted to mix flocculating agents with a fluid exiting the first fluid mixer;
    a manifold adapted to mix a fluid exiting the second fluid mixer with water containing dissolved air;
    a dissolved gas floatation clarifier adapted to separate a fluid exiting the manifold into contaminants and clarified water, the clarified water passing through a passageway in the dissolved gas floatation clarifier to an outlet; and
    a recycle aeration system to supply clarified water containing dissolved air to the manifold, the recycle aeration system comprising
    a recycle pump to pressurize clarified water from the outlet of the passageway; and
    a recycle fluid mixer adapted to mix the pressurized clarified water from the recycle pump with atmospheric air; the recycle fluid mixer in fluid communication with the manifold to provide the clarified water containing dissolved air from the recycle fluid mixer to the manifold, wherein the recycle fluid mixer further comprises a dissolved gas generator having;
    an upper cylindrical donut housing with a fluid inlet the upper cylindrical donut housing having a gas separation chamber;
    a grooved ring having a plurality of grooves, the grooved ring being concentric to the upper cylindrical donut housing, the grooved ring having an outer diameter on a first end that is smaller than a diameter of the upper cylindrical donut housing, thus defining a distribution channel;
    a venturi-orifice ring; and
    a cylinder concentric with the grooved ring, the cylinder in fluid communication with the distribution channel via the grooves, a fluid outlet being located a bottom of the cylinder.

2. A dissolved gas floatation clarifier system to separate contaminants from wastewater by floatation, comprising:
    a first fluid mixer in fluid communication with a wastewater inlet, the first mixer adapted to mix coagulation agents with wastewater from the wastewater inlet;
    a second fluid mixer adapted to mix flocculating agents with a fluid exiting the first fluid mixer;
    a manifold adapted to mix a fluid exiting the second fluid mixer with water containing dissolved air; and
    a dissolved gas floatation clarifier adapted to separate a fluid exiting the manifold into contaminants and clarified water,
    in which at least the first or the second fluid mixer comprises:
    an upper donut housing with a first fluid inlet in the upper donut housing;
    a ring having a plurality of grooves, the ring being concentric to the upper donut housing, the ring having an outer diameter on a first end that is smaller than a diameter of the upper donut housing thus defining a distribution channel;
    an orifice ring; and
    a cylinder concentric with the ring and surrounded by the ring, the cylinder in fluid communication with the distribution channel via the grooves, a fluid outlet being located at a bottom of the cylinder.

3. The dissolved gas floatation clarifier system of claim 1 or 2 wherein the coagulating agent is stored in a first chemical supply, and pumped to the first fluid mixer by a first chemical feed pump, and the flocculating agent is supplied to the second fluid mixer by a second chemical feed pump.

4. The dissolved gas floatation clarifier system of claim 1 or 2, in which the dissolved gas floatation clarifier further comprises:
    a retention chamber for receiving the fluid exiting the manifold, in which the dissolved air comes out of solution to form air bubbles, the air bubbles attaching to the contaminants to float the contaminants;
    a floatation cell for allowing the contaminants to float above the clarified water in the floatation cell;
    a rake assembly adapted to remove the floating contaminants from the floatation cell into a sludge collection chamber; and
    a passageway having an outlet for the clarified water to exit the dissolved gas floatation clarifier.

5. The dissolved gas floatation clarifier system of claim 4, in which the recycle fluid mixer comprising the dissolved gas generator has a built in venturi to draw in atmospheric air.

6. The dissolved gas floatation clarifier system of claim 2, further comprising:
    a retention chamber for receiving a fluid exiting the manifold;
    a floatation cell in fluid communication with the retention chamber for allowing the contaminants to float above the clarified water in the floatation cell;
    a rake adapted to remove the floating contaminants from the floatation cell; and
    a passageway having an outlet for clarified water to exit the dissolved gas floatation clarifier.

7. The dissolved gas floatation clarifier system of claim 4 wherein the retention chamber is separated from the floatation cell by a weir, the weir adapted to isolate a fluid flow in the retention chamber from the floatation cell to form a floatation zone of minimal turbulence within the floatation cell.

8. The dissolved gas floatation clarifier system of claim 7, wherein the sludge container is separated from the floatation cell by an incline.

9. The dissolved gas floatation clarifier system of claim 8 in which the floatation cell has a settling zone, the floatation cell having a lower end, the lower end being conical, contaminants in the settling zone settling in the lower end of the conical floatation cell.

10. The dissolved gas floatation clarifier system of claim 9 further comprising a sludge pump to remove accumulated contaminants from the sludge collection chamber and from the lower end of the conical floatation cell.

11. The dissolved gas floatation clarifier system of claim 4 wherein the rake assembly further comprises:
    a plurality of rakes; and
    a variable speed drive motor, the plurality of rakes adapted to skim the floating contaminants off the water in the floatation cell.

12. The dissolved gas floatation clarifier system of claim 4, further comprising a recycle aeration system to supply water containing dissolved air to the manifold, the recycle aeration system comprising:
    a recycle pump to pressurize clarified water from the outlet of the passageway; and
    a recycle fluid mixer adapted to mix the pressurized water with atmospheric air,
    the recycle fluid mixer in fluid communication with the manifold to provide the water containing dissolved air to the manifold.

13. The dissolved gas floatation clarifier system of claim 12, in which the recycle fluid mixer is a dissolved gas generator comprising a radial-grooved ring mixer adapted to mix the clarified water from the recycle pump with atmospheric air.

14. A dissolved gas floatation clarifier system to separate contaminants from wastewater by floatation, comprising:
    a first fluid mixer in fluid communication with a wastewater inlet, the first mixer adapted to mix coagulation agents with wastewater from the wastewater inlet;
    a second fluid mixer adapted to mix a fluid exiting the first fluid mixer with water containing dissolved air;
    a third fluid mixer adapted to mix flocculating agents with a fluid exiting the first fluid mixer; and
    a dissolved gas floatation clarifier adapted to separate a fluid exiting the third fluid mixer into contaminants and clarified water, in which at least one of the first fluid mixer, second fluid mixer, or third fluid mixer further comprises an upper donut housing with a first fluid inlet in the upper donut housing;
    a ring having a plurality of grooves, the ring being concentric to the upper donut housing, the ring having an outer diameter on a first end that is smaller than a diameter of the upper donut housing thus defining a distribution channel;
    an orifice ring; and
    a cylinder concentric with the ring and surrounded by the ring, the cylinder in fluid communication with the distribution channel via the grooves.

15. The dissolved gas floatation clarifier system of claim 14, in which the dissolved gas floatation clarifier further comprises:
    a retention chamber for receiving the fluid exiting the third fluid mixer, in which dissolved air comes out of solution to form air bubbles, the air bubbles attaching to the contaminants to float the contaminants;
    a floatation cell for allowing the contaminants to float above the water in the floatation cell;
    a rake assembly adapted to remove the floating contaminants from the floatation cell into a sludge collection chamber; and
    a passageway having an outlet for clarified water to exit the dissolved gas floatation clarifier.

16. The dissolved gas floatation clarifier system of claim 15 wherein the retention chamber is separated from the floatation cell by a weir, the weir adapted to isolate a fluid flow in the retention chamber from the floatation cell to form a floatation zone of minimal turbulence within the floatation cell.

17. The dissolved gas floatation clarifier system of claim 16, wherein the sludge container is separated from the floatation cell by an incline.

18. The dissolved gas floatation clarifier system of claim 17 in which the floatation cell has a settling zone, the floatation cell having a lower end, the lower end being conical, contaminants in the settling zone settling in the lower end of the conical floatation cell.

19. The dissolved gas floatation clarifier system of claim 18 further comprising a sludge pump to remove accumulated contaminants from the sludge collection chamber and from the lower end of the conical floatation cell.

20. The dissolved gas floatation clarifier system of claim 15 wherein the rake assembly further comprises:
    a plurality of rakes; and
    a variable speed drive motor, the plurality of rakes adapted to skim the floating contaminants off the water in the floatation cell.

21. The dissolved gas floatation clarifier system of claim 14 wherein the coagulating agent is stored in a first chemical supply, and pumped to the first fluid mixer by a first chemical feed pump, and the flocculating agent is supplied to the second fluid mixer by a second chemical feed pump.

22. The dissolved gas floatation clarifier system of claim 14, further comprising a recycle aeration system to supply water containing dissolved air to the manifold, the recycle aeration system comprising:
    a recycle pump to pressurize clarified water from the outlet of the passageway; and
    a recycle fluid mixer adapted to mix the pressurized water with atmospheric air,
    the recycle fluid mixer in fluid communication with the manifold to provide the water containing dissolved air to the manifold.

23. The dissolved gas floatation clarifier system of claim 22, in which the recycle fluid mixer comprises a dissolved gas generator with a built in venturi to draw in atmospheric air.

24. A dissolved gas floatation clarifier system to separate contaminants from wastewater by floatation, comprising:
    a first fluid mixer in fluid communication with a wastewater inlet, the first mixer adapted to mix a first agent with wastewater from the wastewater inlet to form a first mixture;
    a second fluid mixer adapted to a second agent with the first mixture to form a second mixture;
    a third fluid mixer adapted to mix a third agent with the second mixture to form a third mixture;
    a fourth fluid mixer adapted to mix a fourth agent with the third mixture;
    a manifold adapted to mix the fluid exiting the fourth fluid mixer with water containing dissolved air;
    a dissolved gas floatation clarifier adapted to separate the fluid exiting the manifold into contaminants and clarified water; and
    a plurality of wetting and mixing systems, each first, second, third and fourth agent being provided to the first, second, third and fourth fluid mixer respectively by one of the plurality of the wetting and mixing systems, each of the plurality of wetting and mixing systems:

a wetting housing having a upper part, a lower part, and an access port in the wetting housing's upper part;

a first nozzle in the upper part of the wetting housing; and a second nozzle in the lower part of the wetting housing adapted to spray at the wetting housing's bottom part to swirl a liquid and mix a powder from the access port in the liquid, said spray acting to spray the liquid in a direction toward said first nozzle.

25. The dissolved gas floatation clarifier system of claim 24, wherein the first agent is bentonite, the second agent is activated carbon, the third agent is a coagulating agent, and the fourth agent is a flocculating agent.

26. The dissolved gas floatation clarifier system of claim 24, further comprising a recycle aeration system to supply water containing dissolved air to the manifold, the recycle aeration system comprising:

a recycle pump to pressurize clarified water from an outlet of the dissolved gas floatation clarifier via a passageway; and a recycle fluid mixer adapted to mix the pressurized water with atmospheric air, the recycle fluid mixer in fluid communication with the manifold to provide the water containing dissolved air to the manifold.

27. The dissolved gas floatation clarifier system of claim 24, in which each of the first, second, third, and fourth wetting and mixing systems further comprises:

a tank for storing a liquid, the tank having an outlet port and a vent port;

a fluid mixer substantially on a top of the tank to mix a mixture from the wetting housing with liquid from the tank;

distributors positioned in the tank to distribute a fluid from the fluid mixer into the liquid in the tank; and piping connecting the tank to the wetting housing, the tank, when filled, containing the liquid into which the mixture from the wetting housing may be introduced.

* * * * *